Jan. 21, 1964   G. A. PULLIS ETAL   3,118,722
INDICATION RECORDING SYSTEM
Filed Dec. 30, 1960   8 Sheets—Sheet 1

INVENTORS G. A. PULLIS
T. C. REHM
BY
ATTORNEY

Jan. 21, 1964   G. A. PULLIS ETAL   3,118,722
INDICATION RECORDING SYSTEM
Filed Dec. 30, 1960   8 Sheets-Sheet 2

INVENTORS G. A. PULLIS
T. C. REHM
BY
R. C. Lipton
ATTORNEY

INVENTORS G. A. PULLIS
T. C. REHM
BY R. C. Lipton
ATTORNEY

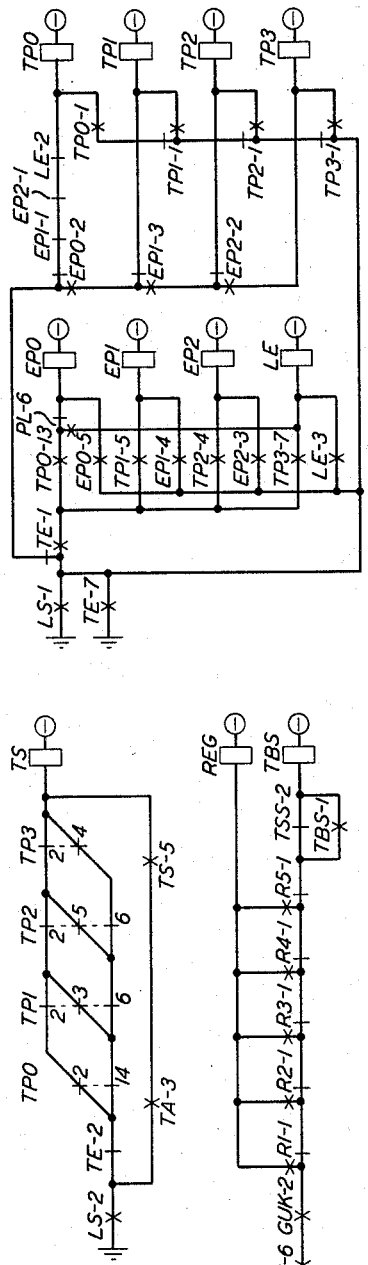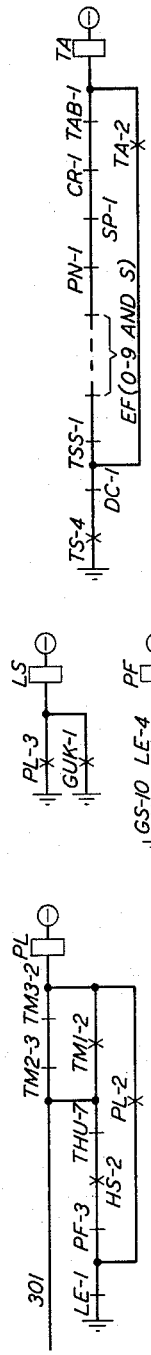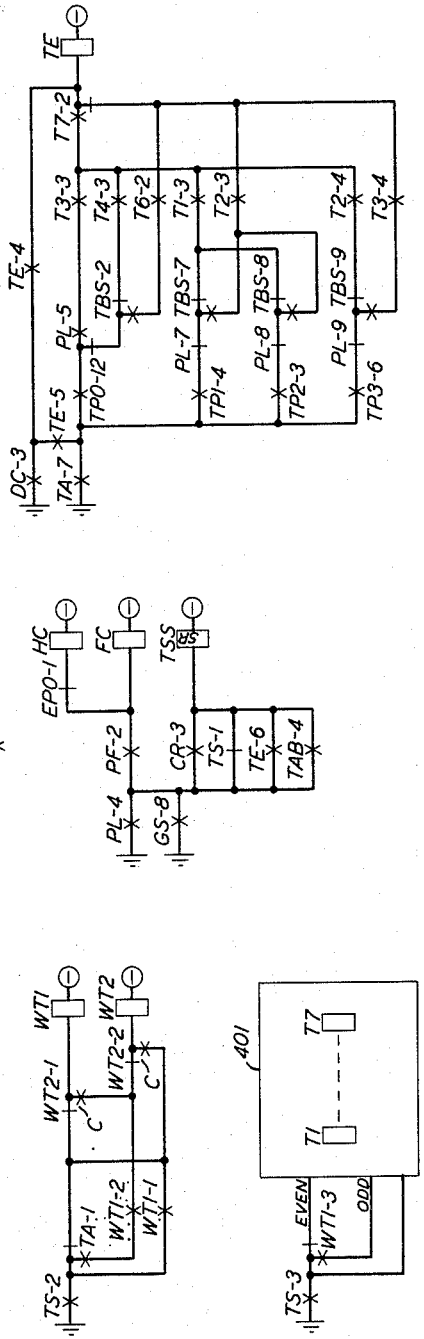
FIG. 4
INVENTORS G. A. PULLIS
T. C. REHM
BY
ATTORNEY

INVENTORS G. A. PULLIS
T. C. REHM
BY
ATTORNEY

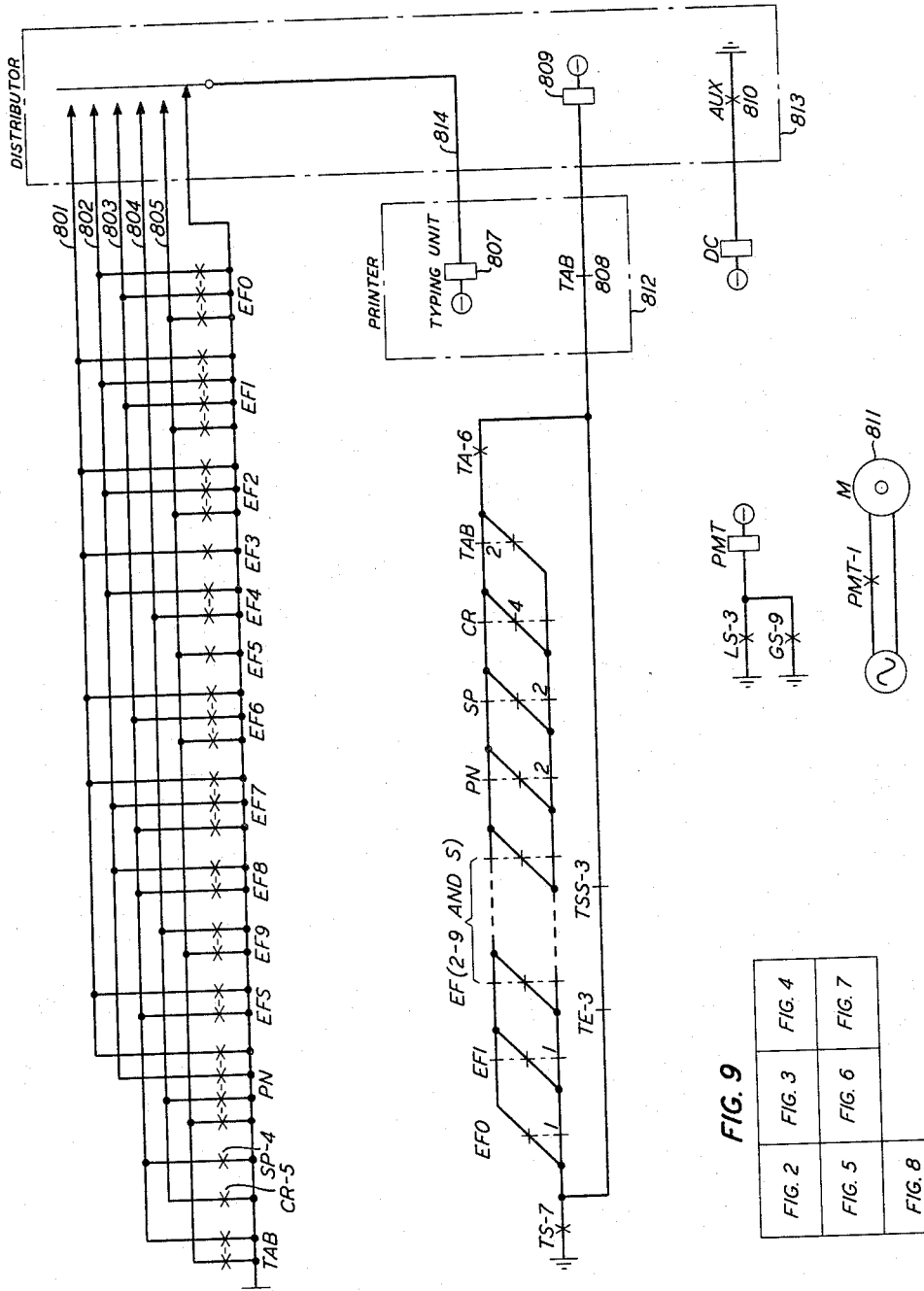

3,118,722
INDICATION RECORDING SYSTEM
George A. Pullis, Middletown Township, Monmouth County, N.J., and Theodore C. Rehm, Islip, N.Y., assignors to Bell Telephone Laboratories, Incorporated, New York, N.Y., a corporation of New York
Filed Dec. 30, 1960, Ser. No. 79,915
8 Claims. (Cl. 346—34)

This invention relates to an indication recording system and more particularly to a system for printing entries on a page record corresponding to alarm indications registered in storage devices by diverse sources.

A broad object of this invention is to provide an improved system for scanning and recording alarm status indications.

Another object of this invention is to provide a page record of status indications entered on the page in a predetermined field array.

Arrangements for printing alarm designations are well known in the art. In certain of these systems, the alarm designations are registered in storage devices which are arranged in a plurality of columns. The storage devices in each column are successively scanned and the condition of each storage device is entered on a record by a page printer in a selected character position in a selected line corresponding to the associated column. Since the status condition of each storage device is entered in a predetermined character position, the storage device can readily be identified by the location of the printed entry.

A further object of this invention is to provide an arrangement for omitting the scanning of certain groups of indicators while entering the status of other indicators in the predetermined character positions.

An additional object of this invention is to omit the scanning of groups of indicators which have no registrations entered therein.

A feature of this invention is a scanning and recording arrangement which simultaneously scans all the storage indicators in a column and prints an entry designating the column in the event that one or more alarms are registered therein.

Another feature of this invention is a scanning arrangement which simultaneously scans all the storage indicators in a portion of the column in the event that one or more alarms are registered in the column.

Another feature of this invention is a scanning and recording arrangement which advances the page printer mechanism past the character positions associated with the storage devices in the column portion in the event that no alarm is registered in the storage devices.

A further feature of this invention is a scanning and recording arrangement which successively scan and enters the condition of each storage device in the column portion in the event that one or more alarms are registered in the storage devices.

An additional feature is a scanning arrangement which advances to simultaneously scan a column of storage devices in the event that no alarm is registered in the storage devices in the prior column.

The means for fulfilling the foregoing objects and the practical embodiment of the features of this invention will be fully understood from the following description taken in conjunction with the accompanying drawings wherein.

Figure 1A:
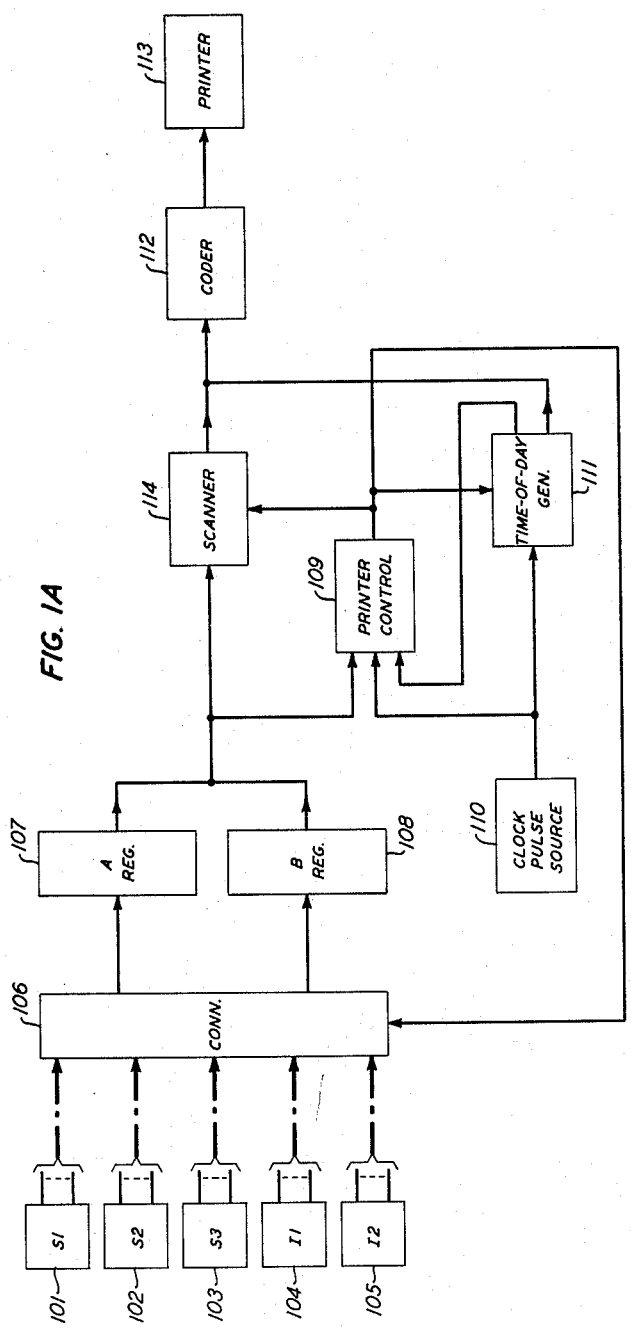
FIG. 1A shows in block form the functional arrangement of the various equipment and circuits and the manner in which they cooperate.

FIGS. 2-8, when arranged as shown in FIG. 9, show the details of circuits and equipment which cooperate to form a system in accordance with this invention.

In the several figures of the drawing, the relay contacts are shown detached from the relay winding. Contacts which are closed, when the associated relay is de-energized, known as "break contacts," are represented by a single short line perpendicular to the conductor line, while contacts which are closed when the relay is energized, known as "make contacts," are represented by two short, crossed lines diagonally intersecting the conductor line. "Break" and "make" contacts in close proximity to each other indicate a set of transfer contacts and if the pair of contacts includes the designation "C," they indicate a set of "continuity" or "make-before-break" contacts. The relay winding is given a designation such as TA, for example, indicated in FIG. 4 of the drawing by a small rectangle. On the drawing, each of the contacts controlled by the relay are given the same designation as the associated relay winding and those contacts referred to in the specification are also given a contact number such, for example, as 1. In the specification the relay winding is referred to as 4–TA and the contacts are referred to as 4–TA–1 where "4" indicates the figure number of the drawing on which the relay winding is located, "TA" is the designation of the relay winding and "1" is the number of the relay contacts.

General Description

Figure 1B:
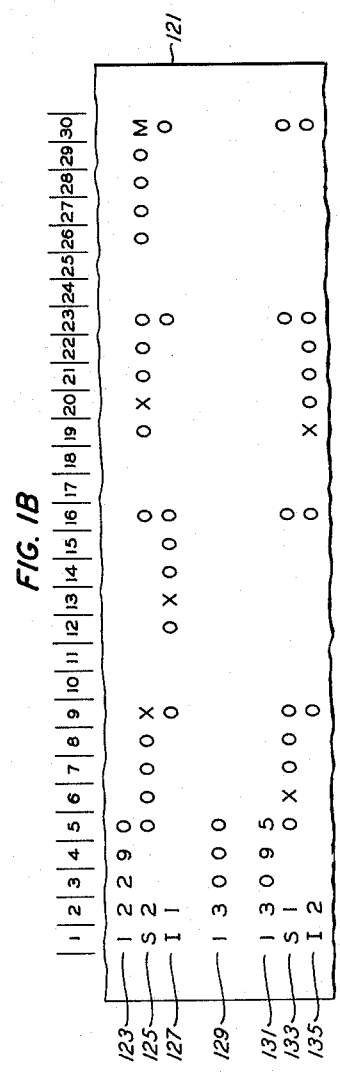
FIG. 1B illustrates a typical arrangement of the entries on a page record.

Referring now to FIGS. 1A and 1B, and more particularly to FIG. 1A, equipment cabinets designated Section 1, Section 2, Section 3, Input 1 and Input 2 are generally indicated by blocks 101 through 105, respectively. Each of cabinets 101 through 105 includes 20 alarm circuits which operate in a manner well known in the art to designate alarm conditions, one of the alarm circuits designating a major alarm condition. Extending from each of the cabinets are 20 leads, each of the leads associated with an individual one of the alarm circuits and energized by the registration of an alarm condition by the associated alarm circuit in a manner well known in the art. The 20 leads extending from each of the cabinets are arranged in four subgroups of five leads each. The cabinet alarm leads are extendible by way of connector 106 to A register 107 or B register 108. Each of registers 107 and 108 includes 100 register relays and each of the register relays is individually operated when connected to the alarm leads by the energization of the alarm lead individual thereto.

FIG. 1B illustrates a typical printed record 121 provided by page printer 113 and including, by way of example, a first line 123 and field entries indicated by lines 125 and 127. The first line 123 indicates, in character positions 1 through 5, the entries which designate the time of day. As illustrated in FIG. 1B, the time entries comprise the numbers 12290 indicating 12 hours and 29 minutes or the conventional clock time of 12:29 p.m. It is noted that the number in the fifth character position may be either 0 or 5, designating the initial or terminal one-half minute interval, respectively.

Line 125 illustrates the characters S2 in character positions 1 and 2, disclosing that Section 2 cabinet 102 has registered one or more alarms at the time interval indicated on line 123. The letters O or X in character positions 5 through 9 indicate the absence or presence of alarms registered by the first subgroup of five leads from cabinet 102. Similarly, the entries in character positions 12 through 16 indicate the alarms registered in the second subgroup, the entries in character positions 19 through 23 indicate the alarms registered in the third subgroup and the entries in the character positions 26 through 30 indicate the alarms registered in the fourth subgroup of leads. The absence of entries in character positions 12 through 15 together with the letter O printed in the 16th character position indicates that none of the five leads of the second subgroup has registered an alarm. The character M printed in the 30th character position discloses that the final lead is associated with a major alarm circuit, which circuit has registered an alarm. The following line 127 illustrates that Input 1 cabinet 104 has registered one or more alarms, which alarms are entered in the same manner.

To provide the first line and field entries shown on record 121, printer 113 is arranged to advance record 121 one line and restore the typing mechanism of printer 113 to the first character position in response to the character Carriage-Return. In addition, printer 113 is arranged to advance the typing mechanism one character position and set the mechanism in the lower-case or "letters" condition in response to the character Space. In addition, printer 113 includes a "tabulator" bar having "stop" contacts adjacent to character positions 9, 16, 23 and 30 and a function mechanism which responds to a "tabulate" function character by horizontally advancing the typing mechanism to the next "stop" contact. A page printer suitable for use in this system and disclosing an arrangement for advancing the typing mechanism one character position and setting the mechanism in the lower-case condition in response to the character Space is disclosed in Patent 2,505,729 granted to W. J. Zenner on April 25, 1950. A horizontal tabulating arrangement for advancing a typing mechanism to a stop contact on a tabulator bar is disclosed in Patent 2,104,071 granted to C. W. Burcky on January 4, 1938. An arrangement for simultaneously restoring the typing mechanism to the first character position and advancing the page record one line is disclosed in Patent 2,708,217 granted to B. F. Madsen on May 10, 1955. The disclosures of all of these patents are hereby incorporated herein by reference as though fully set forth herein.

Assuming now that connector 106 extends the cabinet alarm leads to A register 107 and further assuming that alarm indications are regitsered in the 5th, 12th and 20th leads extending from cabinet 102 and the 7th lead extending from cabinet 127, these alarms are registered in A register 107 which in response thereto prepares printer control circuit 109 to initiate the operation of the system. Printer control circuit 109, however, does not initiate the operation of the system until a clock pulse is applied thereto by clock pulse source 110.

Clock pulse source 110 is arranged to generate a clock pulse at the termination of each 30-second interval. This clock pulse is applied to printer control circuit 109 and time-of-day generator 111. The application of each clock pulse to time-of-day generator 111 advances generator 111 to maintain the time-of-day count. In addition, the application of the clock pulse to printer control circuit 109 initiates the operation of the system in the event that printer control circuit 109 has been prepared by one of register circuits 107 or 108.

The energization of printer control circuit 109 as described above operates connector 106 to transfer the alarm leads from A register 107 to B register 108 whereby subsequent alarm indications are registered in B register 108. In addition, printer control circuit 109 initiates the operation of time-of-day generator 111. Time-of-day generator 111 in turn sequentially instructs coder 112 to apply teletypewriter characters Carriage-Return and Figures to printer 113 followed by the five teletypewriter characters designating the time of day and concluding with the teletypewriter characters Space and Carriage-Return. The application of the initial characters, Carriage-Return and Figures, to printer 113 advances record 121 one line, restores the typing mechanism to the first character position and sets the typing mechanism in the upper-case or "figures" condition. The typing mechanism of printer 113 is now positioned to print the entries designating the time of day in the first five character positions of line 123, for example, on page record 121. The subsequent characters, Space and Carriage-Return, returns the mechanism to the lower-case condition, restores the mechanism to the first character position and advances record 121 to line 125.

The impression of the character Carriage-Return concludes the operation of time-of-day generator 111 and printer control circuit 109 then initiates the operation of scanner 114. Scanner 114 simultaneously scans the register relays, in register 107, associated with the alarm leads extending from Section 1 cabinet 101. Since it is assumed that no alarms are registered by cabinet 101, scanner 114 advances to simultaneously scan the register relays associated with the alarm leads extending from cabinet 102. Upon detection of one or more alarms registered by cabinet 102, scanner 114 instructs coder 112 to impress the letter character S, the character Figures, the number character 2 and the character Space on printer 113 in sequence. The impression of the character S on printer 113 enters this character in the first character position of line 125. The subsequent character Figures sets the typing mechanism in the upper-case condition whereby the number 2 is entered in the second character position. The subsequent character Space advances the typing mechanism one character position and resets the typing mechanism in the lower-case condition.

Scanner 114 now proceeds to simultaneously scan the first subgroup of register relays, in register 107, associated with the alarm leads extending from cabinet 102. Since the fifth lead of the first subgroup has registered an alarm, scanner 114 instructs coder 112 to impress the character Space on printer 113 and then sequentially scans each of the register relays associated with the subgroup and instructs coder 112 to impress the appropriate character on printer 113 in accordance with the presence or absence of an alarm condition registered by the scanned relay.

At the conclusion of the scanning of the first subgroup, scanner 114 simultaneously scans the register relays associated with the second subgroup. Since no alarms have been registered by the second subgroup, scanner 114 instructs coder 112 to impress the tabulate function character and the letter O on printer 113 in sequence whereby the typing mechanism advances to the 16th character position and prints the letter O thereat. Scanner 114 thereafter similarly scans the third and fourth subgroup of register relays in register 107 whereby the appropriate characters are printed in character positions 19 through 23 and 26 through 30 with the exception that the letter M is printed in character position 30 in response to the scanning of an alarm condition registered in the last relay of the fourth subgroup.

At the conclusion of the scanning of the register relays associated with cabinet 102, scanner 114 instructs coder 112 to impress the character Carriage-Return on printer 113 whereby record 121 advances to line 127 and the typing mechanism is restored to the first character position. Thereafter, scanner 114 proceeds to simultaneously scan the register relays associated with each cabinet and in the event that an alarm is registered by a cabinet, scanner 114 instructs coder 112 to impress the characters designating the cabinet on printer 113 followed by the entries indicating the presence or absence of the alarm conditions. After the scanning of the last cabinet, scanner 114 instructs coder 112 to impress the character Carriage-Return on printer 113, advancing the record 121 to the next subsequent line and restoring the typing mechanism to the first character position.

Assuming now that no alarm indications are registered in B register 108, clock pulse source 110 continues to advance time-of-day generator 111 and, at the conclusion of the hour interval, time-of-day generator 111, reinitiates the operation of the system by energizing printer control circuit 109. The energization of printer control circuit 109 reinitiates the operation of time-of-day generator 111 which in turn instructs coder 112 to impress the sequence Carriage-Return and Figures on printer 113 thereby advancing record 121 to line 129 and setting the typing mechanism in the upper-case condition. The time-of-day generator 111 then effects the impression of the characters designating the hour interval which designation is illustrated on line 129 as 13000, indicating the time as 13 hours or 1 p.m. At the conclusion of the time-of-day entry, the sequence Space and Carriage-Return is impressed on printer 113 to reset the typing mechanism to the lower-case condition, restore the typing mechanism to the first character position and advance record 121 to the next subsequent line.

Assuming that the next alarm condition is registered after 1:09 p.m., the next subsequent clock pulse initiates the operation of the system in the same manner as described above. Accordingly, connector 106 again extends the alarm leads to A register 107 and record 121 is advanced to line 131 and the entry 13095, representing one-half minute past 1:09 p.m., is printed. Scanner 114 then proceeds to scan the register relays in register 108 in the same manner as it previously scanned the register relays in register 107 whereby lines 133 and 135, illustrated in FIG. 1B, are printed in the event that the appropriate alarm conditions are registered. At the conclusion of the scanning of the register relays in register 108, the circuit is restored to the initial condition.

*Time-of-Day Generator*

Figure 2:
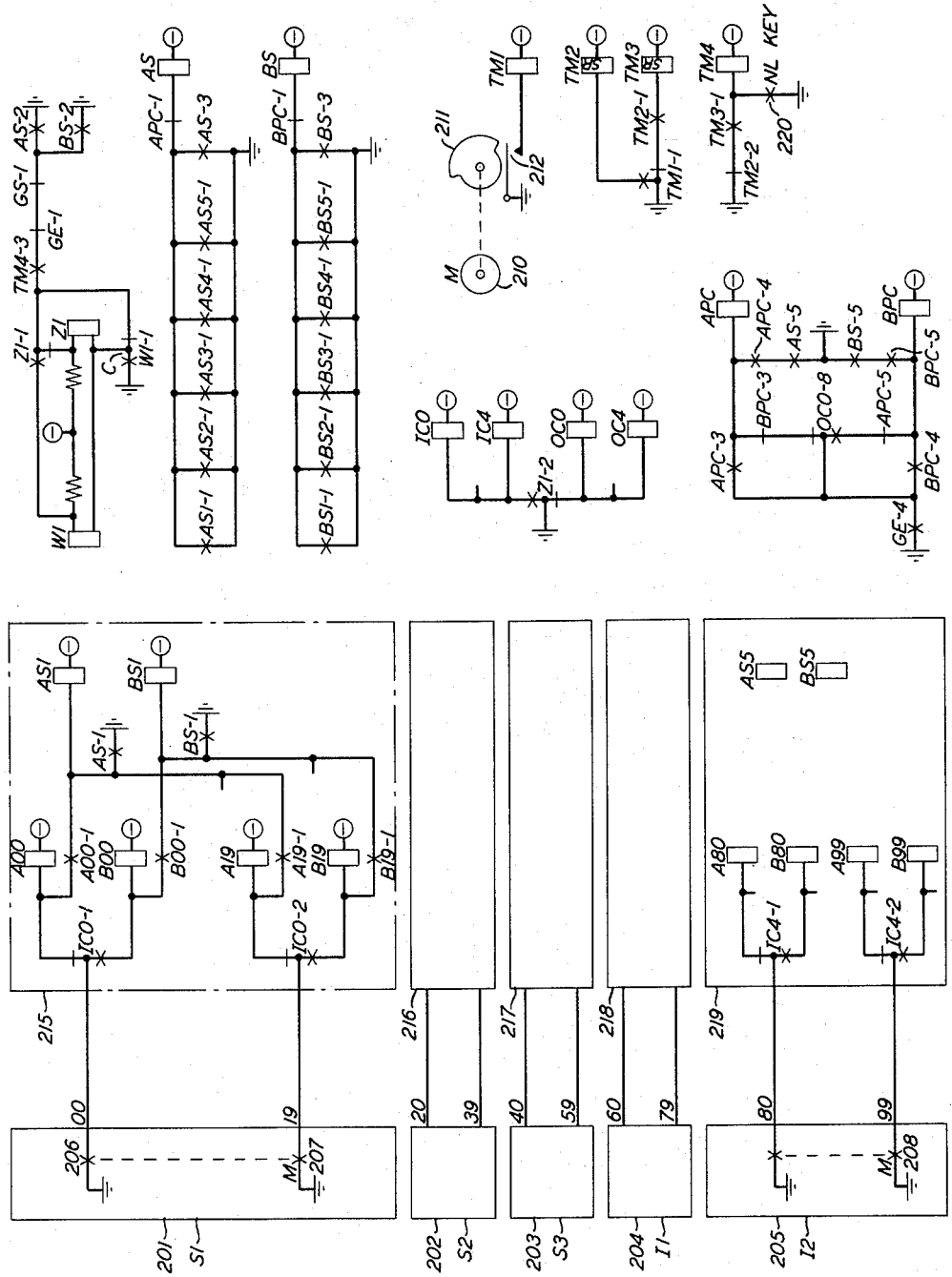

Referring now to FIG. 2, timing pulses for the system are provided by shaft-driven cam 211 which alternately closes and opens contact 212 every 15 seconds. The power for driving the cam shaft, not shown, is provided by motor 210.

The closure of contact 212 completes an operating path for relay 2-TM1. When contact 212 opens, relay 2-TM1 releases. Thus, relay 2-TM1 is successively operated for 15 seconds and released for 15 seconds.

The operation of relay 2-TM1 completes an operating path for slow-to-release relay 2-TM2 by way of the make contacts of contacts 2-TM1-1. The subsequent release of relay 2-TM1 after 15 seconds, completes an operating path for slow-to-release relay 2-TM3 by way of the break contacts of contacts 2-TM1-1 and make contacts 2-TM2-1. In addition, relay 2-TM1 released, opens the previously-described operating path for relay 2-TM2. The subsequent release of relay 2-TM2 completes a path from ground by way of break contacts 2-TM2-2, make contacts 2-TM3-1 and the winding of relay 2-TM4 to battery, operating relay 2-TM4. In addition, the release of relay 2-TM2 opens the previously-described operating path of slow-to-release relay 2-TM3. The subsequent release of relay 2-TM3 opens the previously-described operating path for relay 2-TM4, releasing the relay. The next closure of contact 212 again operates relay 2-TM1 whereby the previously-described process is repeated. Thus relay 2-TM4 is momentarily operated every 30 seconds.

Figure 5:
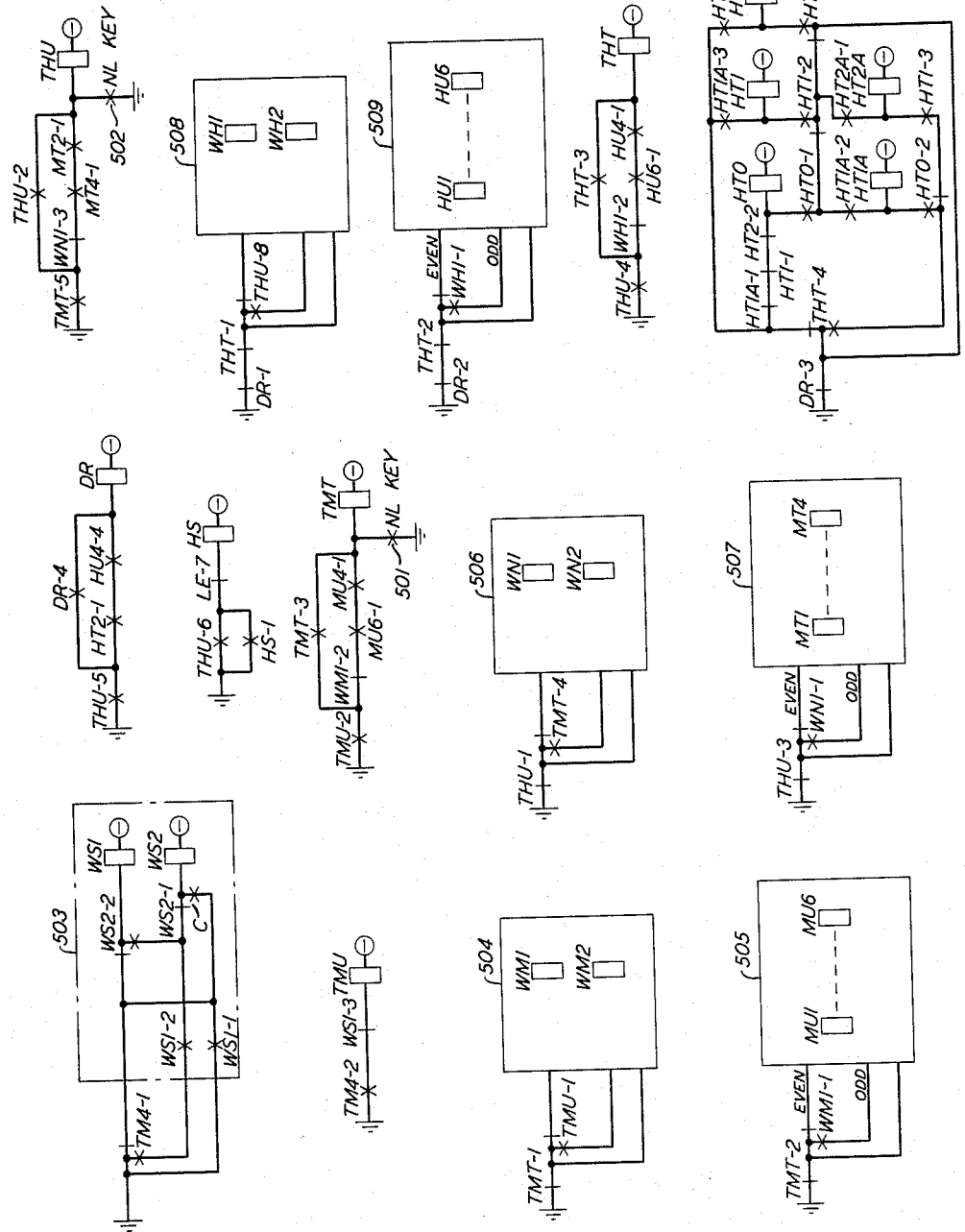
Figure 6:
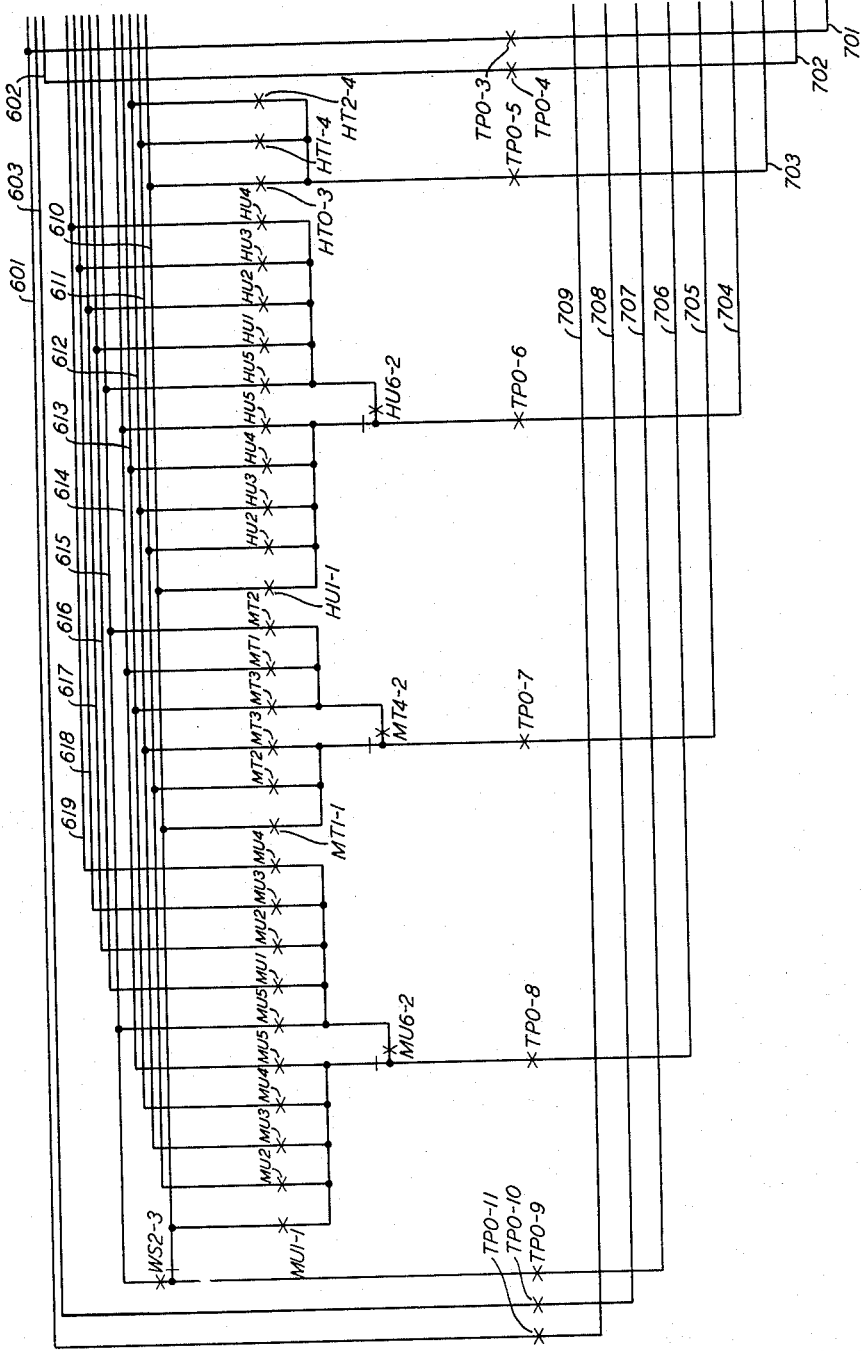
Figure 7:
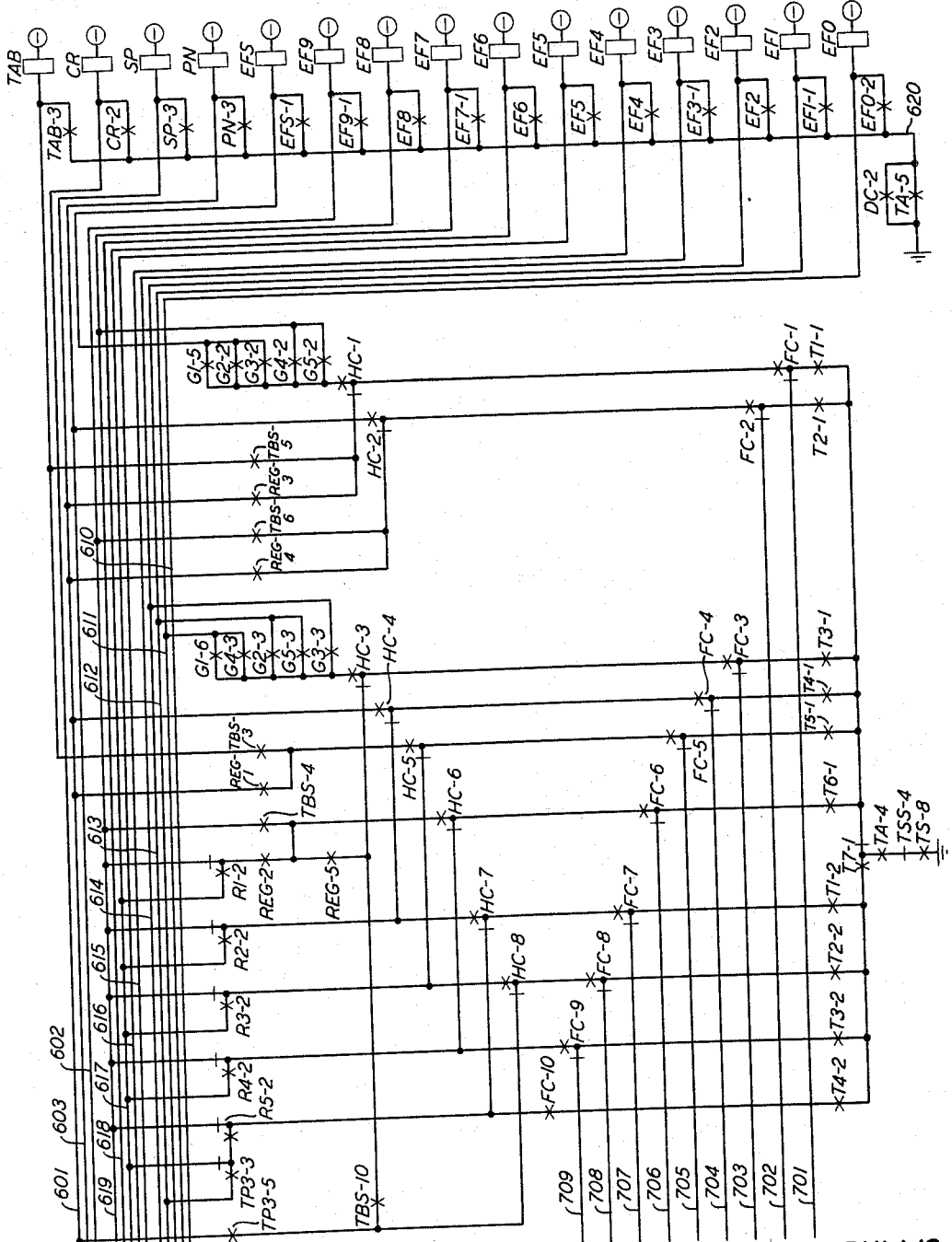

Referring now to FIG. 5, block 503 generally indicates a pulse divider including relays 5-WS1 and 5-WS2. In the normal condition a path from ground by way of the break contacts of contacts 2-TM4-1, the break contacts of continuity contacts 5-WS2-2 and the winding of relay 5-WS1 to battery, operates relay 5-WS1 which locks by way of the break contacts of contacts 5-WS-2 and make contacts 5-WS1-1. When relay 2-TM4 momentarily operates, as previously described, a path is completed from ground by way of the make contacts of contacts 2-TM4-1, make contacts 5-WS1-2, the break contacts of continuity contacts 5-WS2-1 and the winding of relay 5-WS2 to battery, operating the relay which locks by way of the make contacts of contacts 5-WS2-1 and the make contacts of contacts 5-WS1-1. Relay 5-WS1 is maintained locked to ground by way of the make contacts of continuity contacts 5-WS2-2, make contacts 5-WS1-2 and the make contacts of contacts 2-TM4-1.

The subsequent release of relay 2-TM4 opens the previously-described holding path for relay 5-WS1 whereby the relay releases. The release of relay 2-TM4 also maintains a holding path for relay 5-WS2 by way of the make contacts of contacts 5-WS2-1 and the break contacts of contacts 2-TM4-1.

The next momentary operation of relay 2-TM4 opens the holding path for relay 5-WS2 via the break contacts of contacts 2-TM4-1. The subsequent release of relay 2-TM4 recompletes the previously-described operating path for relay 5-WS1. The pulse divider circuit is now in its initial condition. It is noted that relay 5-WS1 alternately operates and releases in response to the successive momentary operations of relay 2-TM4. Thus, relay 5-WS1 is alternately operated and released for each 60-second interval and, conversely, relay 5-WS2 is alternately released and operated for each 60-second interval.

It is recalled that in the initial condition, relay 5-WS1 operates for a 30-second interval and releases for the subsequent 30-second interval. With relay 5-WS1 released, the operation of relay 2-TM4 at the termination of the second interval completes a path from ground by way of make contacts 2-TM4-2, break contacts 5-WS1-3 and the winding of relay 5-TMU to battery whereby relay 5-TMU is momentarily operated by the momentary operation of relay 2-TM4. On the subsequent operation of relay 2-TM4, relay 5-WS1 is operated, as previously described, whereby the operating path for relay 5-TMU is not completed. Accordingly, relay 5-TMU is momentarily operated by alternate operations of relay 2-TM4 whereby relay 5-TMU is momentarily operated every 60 seconds or once per minute.

Pulse divider 504 which includes relays 5-WM1 and 5-WM2 is arranged in the same manner as pulse divider 503. Accordingly, since the driving pulses for pulse divider 504 are provided by contacts 5-TMU-1 and relay 5-TMU momentarily operates once per minute, relay 5-WM1 alternately operates and releases each successive 60 seconds starting with the initial condition of relay 5-WM1 operated.

Block 505 generally indicates a pulse counter including relay 5-MU1 through 5-MU6. With relay 5-WM1 initially operated, ground is applied to the odd input of counter 505 by way of break contacts 5-TMT-2 and the make contacts of contacts 5-WM1-1. The release of relay 5-WM1 after the first minute, provides ground to the even input of counter 505 by way of the break contacts of contacts 5-WM1-1. In general, counter 505 functions to operate relay 5-MU1 in response to the first application of ground to the odd input, to operate relay 5-MU2 and release relay 5-MU1 in response to the first application of ground to the even input and in the same manner successively to operate relays 5-MU3 through 5-MU6. Relay 5-MU6, however, locks by way of break contacts 5-TMT-2 and although relays 5-MU1 through 5-MU5 are successively operated in response to the subsequent applications of ground to the odd and even input leads, relay 5-MU6 is maintained operated. In addition, relay 5-MU5, when operated, does not release until the subsequent operation of relay 5-MU1. Accordingly, counter 505 is advanced each 60 seconds by relay 5-WM1 starting with relay 5-MU1 operated in the initial condition, relays 5-MU2 through 5-MU5 operated during the first through fourth minute intervals, respectively, and relays 5-MU5 and 5-MU6 operated during the fifth minute interval whereupon after six minutes relay 5-MU1 operates to release relay 5-MU5 and, with relay 5-MU6 operated, the counter is again advanced by relay 5-WM1. A relay counter of this type is described in detail in an application of T. L. Dimond et al., Serial No. 560,160, filed on January 19, 1956, which issued as Patent 2,996,704 on August 15, 1961.

After nine minutes, relays 5-MU4 and 5-MU6 are operated as previously described. One minute later, relay 5-TMU operates and a path is completed from ground by way of make contacts 5-TMU-2, break contacts 5-WM1-2, make contacts 5-MU6-1, make contacts 5-MU4-1 and the winding of relay 5-TMT to battery, operating relay 5-TMT which locks by way of make contacts 5-TMT-3 and make contacts 5-TMU-2. Relay 5-TMT operated, removes ground from the even and odd input leads of counter 505 and opens the previously-described locking path for relay 5-MU6 whereby relays 5-MU4 and 5-MU6 release. In addition, relay 5-TMT operated, removes the ground applied to pulse divider 504 by way of break contacts 5-TMT-1 insuring that relays 5-WM1 and 5-WM2 are released. The subsequent release of relay 5-TMU opens the previously-described locking path for relay 5-TMT. The release of relay 5-TMT recompletes the operating path for relay 5-WM1 as previously described. Relay 5-WM1 operated reoperates relay 5-MU1, as previously described, restoring counter 505 to its initial condition. Relay 5-TMT is thus momentarily operated by relay 5-TMU every ten minutes.

Pulse divider 506, which includes relays 5-WN1 and 5-WN2, is arranged in the same manner as pulse divider 503 with relay 5-WN1 operated in the initial condition. Pulses are applied to pulse divider 506 by way of break contacts 5-THU-1 and contacts 5-TMT-4. Accordingly, relay 5-WN1 is alternately released and operated by the successive momentary operations of relay 5-TMT whereby, starting from an initial operated condition, relay 5-WN1 releases after ten minutes, reoperates after 20 minutes, etc.

Block 507 generally indicates a pulse counter which includes relays 5-MT1 through 5-MT4 arranged substantially identical to pulse counter 505. In the initial condition with relay 5-WN1 operated, ground is applied by way of break contacts 5-THU-3 and the make contacts of contacts 5-WN1-1 to the odd input of counter 507 whereby relay 5-MT1 is initially operated. After ten minutes, relay 5-WN1 releases, applying ground by way of the break contacts of contacts 5-WN1-1 to the even input of counter 507 whereby relay 5-MT2 operates. Accordingly, counter 507 is advanced every ten minutes until relay 5-MT5 operates and locks by way of break contacts 5-THU-3 and the counter recycles to again operate relay 5-MT1.

After 50 minutes, relays 5-MT2 and 5-MT4 are operated. At the end of the subsequent ten-minute period, relay 5-TMT operates and with relay 5-WN1 released during the sixth ten-minute interval, a path is completed from ground by way of make contacts 5-TMT-5, break contacts 5-WN1-3, make contacts 5-MT4-1, make contacts 5-MT2-1 and the winding of relay 5-THU to battery, operating relay 5-THU which locks by way of make contacts 5-THU-2 and make contacts 5-TMT-5. Relay 5-THU operated, removes ground applied by way of break contacts 5-THU-3 to the input paths and the locking path of counter 507 whereby relays 5-MT4 and 5-MT2 release. In addition, relay 5-THU operated, removes ground applied by way of break contacts 5-THU-1 to pulse divider 506, insuring that relays 5-WN1 and 5-WN2 are released. The subsequent release of relay 5-TMT opens the previously-described locking path for relay 5-THU whereby the relay releases. Accordingly, relay 5-THU operates to restore pulse divider 506 and counter 507 to the initial condition after a 60-minute interval.

Pulse divider 508, which includes relays 5-WH1 and 5-WH2, is arranged in the same manner as pulse divider 503 with relay 5-WH1 operated in the initial condition. Pulses are applied to pulse divider 508 by way of break contacts 5-DR-1, break contacts 5-THT-1 and contacts 5-THU-3. Accordingly, relay 5-WH1 is alternately released and operated by the successive momentary operations of relay 5-THU whereby, starting from an initial operating condition, relay 5-WH1 releases after one hour, reoperates after two hours, etc.

Block 509 generally indicates a pulse counter which includes relays 5-HU1 through 5-HU6 arranged substantially identical to pulse counter 505. In the initial condition with relay 5-WH1 operated, ground is applied by way of break contacts 5-DR-2, break contacts 5-THT-2 and the make contacts of contacts 5-WH1-1 to the odd input of counter 509 whereby relay 5-HU1 is initially operated. Accordingly, counter 509 is advanced every hour until relay 5-HU6 operates and locks by way of break contacts 5-THT-2 and break contacts 5-DR-2 and the counter recycles to again operate relay 5-HU1.

After nine hours and during the tenth-hour interval, relays 5-HU4 and 5-HU6 are operated. At the conclusion of the tenth-hour interval, relay 5-THU operates and a path is completed from ground by way of make contacts 5-THU-4, break contacts 5-WH1-2, make contacts 5-HU6-1, make contacts 5-HU4-1 and the winding of relay 5-THT to battery, operating the relay which locks by way of make contacts 5-THT-3 and make contacts 5-THU-4. Relay 5-THT operated, removes ground from the inputs to pulse divider 508 and from the inputs to pulse counter 509, releasing the pulse divider 508 relays and the pulse counter 509 relays. The subsequent release of relay 5-THU opens the previously-described locking path for relay 5-THT and relay 5-THT released, restores pulse divider 508 and pulse counter 509 to the initial condition. Relay 5-THT is thus momentarily operated by relay 5-THU at the conclusion of each ten-hour interval.

In the initial condition, relay 5-THT is released, completing a path from ground by way of break contacts 5-DR-3, the break contacts of contacts 5-THT-4, break contacts 5-HT1A-1, break contacts 5-HT1-1, break contacts 5-HT2-2 and the winding of relay 5-HT0 to battery, operating relay 5-HT0 which locks by way of make contacts 5-HT0-1, the break contacts of contacts 5-HT1-2, the break contacts of contacts 5-HT2-3 and break contacts 5-DR-3. At the conclusion of the first ten-hour interval, relay 5-THT momentarily operates, completing a path from ground by way of break contacts 5-DR-3, the make contacts of contacts 5-THT-4, the make contacts of contacts 5-HT0-2 and the winding of relay 5-HT1A to battery, operating the relay which locks by way of make contacts 5-HT1A-2 and contacts 5-HT1-2, 5-HT2-3 and 5-DR-3. The subsequent release of relay 5-THT completes a path by way of break contacts 5-DR-3, the break contacts of contacts 5-THT-4, make contacts 5-HT1A-3 and the winding of relay 5-HT1 to battery, operating relay 5-HT1 at the conclusion of the first ten-hour interval and relay 5-HT1 locks by way of the make contacts of contacts 5-HT1-2 and contacts 5-HT2-3 and 5-DR-3. Relay 5-HT1 operated, opens the previously-described locking paths for relays 5-HT0 and 5-HT1A and these relays release.

At the conclusion of the second ten-hour interval, relay 5-THT momentarily operates completing a path from ground by way of break contacts 5-DR-3, the make contacts of contacts 5-THT-4, the break contacts of contacts 5-HT0-2, make contacts 5-HT1-3 and the winding of relay 5-HT2A to battery, operating the relay which locks by way of contacts 5-HT2A-1, 5-HT2-3 and 5-DR-3. The subsequent release of relay 5-THT completes a path by way of break contacts 5-DR-3, the break contacts of contacts 5-THT-4, make contacts 5-HT2A-2 and the winding of relay 5-HT2 to battery, operating the relay at the conclusion of the second ten-hour interval and the relay locks by way of the make contacts of contacts 5-HT2-3 and break contacts 5-DR-3. Relay 5-HT2 operated, opens the previously-described locking path for relays 5-HT1 and 5-HT2A and these relays release.

Three hours after the operation of relay 5-HT2 and during the subsequent one-hour interval, relay 5-HU4 is operated as previously described. At the conclusion of the hour interval, relay 5-THU operates, as previously described, completing a path from ground by way of make contacts 5-THU-5, 5-HT2-1 and 5-HU4-4 and the winding of relay 5-DR to battery, operating the relay which locks by way of make contacts 5–DR–4 and 5–THU–5. Relay 5–DR operated, opens the previously-described pulsing and holding path for pulse divider 508, the previously-described pulsing and holding path for counter 509 and the previously-described holding path for relay 5–HT2 whereby the pulse divider 508 relays, the pulse counter 509 relays and relay 5–HT2 are released. The subsequent release of relay 5–THU opens the previously-described locking path for relay 5–DR which releases and restores pulse divider 508 and counter 509 to the initial condition. In addition, the release of relay 5–DR completes the previously-described operating path for relay 5–HT0.

Summarizing the operations of the previously-described pulse divider and pulse counting relays, it is seen that relay 5–WS2 is released for an initial 30-second interval and operated for a final 30-second interval during each minute interval. Relays 5–MU1 through 5–MU6 count each minute interval and are restored to the initial condition after a ten-minute interval. Relays 5–MT1 through 5–MT4 count each ten-minute interval and restore to the initial condition after one hour. Relays 5–HU1 through 5–HU6 count each hour interval and restore to the initial condition after a ten-hour interval and relays 5–HT0 through 5–HT2 count each ten-hour interval and together with relays 5–HU1 through 5–HU6 restore to the initial condition after a 24-hour interval. Accordingly, a 30-second, minute-units, minute-tens, hour-units and hour-tens count is provided for each 24-hour interval.

The 30-second and minute-units count may be adjusted to conform with the time of day by repeatedly operating key 220, FIG. 2, whereby relay 2–TM4 is repeatedly operated to advance pulse divider 503 and thus advance counter 505. Similarly, the minute-tens count may be adjusted to conform with the time of day by repeated operations of key 501, FIG. 5, to advance pulse divider 506 and counter 507. In the same manner the hour-units count and hour-tens count can be advanced by the operation of key 502.

*Storage of Alarm Indications*

Referring now to FIG. 2, cabinet Sections 1 through 3 are generally indicated by blocks 201 through 203, respectively, and Input cabinets 1 and 2 are generally indicated by blocks 204 and 205, respectively. Cabinet 201, which is typical of the cabinets, includes 20 contacts of which contacts 206 and 207 are shown, which contacts momentarily operate in response to an alarm condition in a manner well known in the art. The final contact 207 is designated a major alarm condition. Each of the 20 contacts, when operated, extends ground to an associated lead 00 through 19, which leads extend to a relay storage arrangement generally indicated by block 215. Similarly, the 20 leads extending from cabinets 202 through 205 extend to relay storage arrangements 216 through 219.

Lead 00 is extendible by way of contacts 2–IC0–1 to the winding of register relay 2–A00 or 2–B00. Similarly, lead 19 is extendible by way of contacts 2–IC0–2 to the winding of register relay 2–A19 or 2–B19. In the same manner, each of the leads is extendible to an associated 2–A or 2–B register relay. The winding of relay 2–AS1 is extendible to the winding of each of the 2–A register relays by way of a set of make contacts of the 2–A register relay. Similarly, the winding of relay 2–BS1 is extendible to the winding of each of the 2–B register relays by way of a set of make contacts of the 2–B register relay. In the same manner, leads 20 through 39 are extendible from cabinet 202 to associated 2–A and 2–B register relays by way of the contacts of relay 2–IC1; leads 40 through 59 are extendible from cabinet 203 to associated 2–A and 2–B register relays by way of contacts of relay 2–IC2; leads 60 through 79 are extendible from cabinet 204 to 2–A and 2–B register relays by way of the contacts of relay 2–IC3, and leads 80 through 99 are extendible from cabinet 205 to register relays 2–A and 2–B by way of the contacts of relay 2–IC4. In addition, register relays 2–A20 through 2–A39 and 2–B20 through 2–B39 are connected to relays 2–AS2 and 2–BS2, respectively, in substantially the same manner as relay arrangement 215. Similarly, the register relays in relay arrangements 217, 218 and 219 are connected to the winding of relays 2–AS3 through 2–AS5 and 2–BS3 through 2–BS5, respectively, in the same manner as the arrangement shown in block 215.

Assuming now that contact 206 is momentarily operated and relay 2–IC0 is released, ground is applied by way of contact 206, the break contacts of contacts 2–IC0–1 and the winding of relay 2–A00 to battery, operating the relay which extends the operating ground by way of make contact 2–A00–1 and the winding of relay 2–AS1 to battery. Relay 2–AS1 operated, completes a path from ground by way of make contact 2–AS1–1, break contact 2–APC–1 and the winding of relay 2–AS to battery, operating relay 2–AS which locks by way of break contacts 2–APC–1 and make contacts 2–AS–3. Relay 2–AS operated, provides holding ground for relay 2–AS1 by way of make contacts 2–AS–1 and holding ground for relay 2–A00 by way of make contacts 2–A00–1. Accordingly, with relay 2–IC0 released, the momentary operation of an alarm contact operates the associated 2–A register relay, the 2–AS1 through 2–AS5 relay connected thereto and relay 2–AS which provides a holding path for the above-described relays.

As previously described, relay 2–TM4 operates at the conclusion of each 30-second interval. Assuming that an alarm indication is registered in the 2–A register relays, relay 2–AS is operated and a path is completed from ground by way of make contacts 2–AS–2, break contacts 3–GS–1, break contacts 3–GE–1, make contacts 2–TM4–3, the break contacts of continuity contacts 2–W1–1 and the winding of relay 2–W1 to battery, operating relay 2–W1 which locks by way of the make contacts of contacts 2–W1–1. The subsequent release of relay 2–TM4 removes shunting ground applied to the winding of relay 2–Z1 by way of the break contacts of contacts 2–Z1–1 whereby a path is completed from ground by way of the make contacts of contacts 2–W1–1 and the winding of relay 2–Z1 to battery, operating the relay. Relay 2–Z1 operated, completes an obvious operating path for relays 2–IC0 through 2–IC4, operating these relays and opens an obvious operating path for relays 2–OC0 through 2–OC4, releasing these relays. Relay 2–OC0 released, completes a path from ground by way of the winding of relay 3–GS, FIG. 3, break contacts 2–BPC–2, break contacts 2–APC–2, the break contacts of contacts 3–GE–2, the break contacts of contacts 2–OC0–1 and make contacts 2–AS–4, operating relay 3–GS. The operation of relay 3–GS, as described hereinafter, initiates the printing of the alarm indications registered in relays 2–A00 through 2–A99 after which printing operation relay 3–GS, relay 2–AS, the operated ones of the 2–A register relays and associated 2–AS1 through 2–AS5 relays release.

Relays 2–IC0 through 2–IC4 operated, transfer the previously-described paths extending leads 00 through 99 to the windings of relays 2–A00 through 2–A99, respectively, to the windings of relays 2–B00 through 2–B99. Accordingly, subsequent alarm indications are registered in the 2–B register relays. For example, assuming contact 206 now momentarily operates, ground is applied by way of contact 206, lead 00, the make contact of contacts 2–IC0–0 and the winding of relay 2–B00 to battery, operating relay 2–B00 which extends the ground to the winding of relay 2–BS1 by way of make contacts 2–B00–1. The operation of relay 2–BS1 completes a path from ground by way of make contacts 2–BS1–1, break contacts 2–BPC–1 and the winding of relay 2–BS to battery, operating relay 2–BS which locks by way of break contacts 2–BPC–1 and make contacts 2-BS-3. Accordingly, during the next 30-second interval, alarm indications are registered in the 2-B register relays, operating the 2-BS1 through 2-BS5 relays connected thereto whereby relay 2-BS operates to hold the above-mentioned relays operated.

The next subsequent operation of relay 2-TM4 applies shunting ground to relay 2-W1 by way of make contacts 2-BS-2, break contacts 3-GS-1, break contacts 3-GE-1, make contacts 2-TM4-3 and the make contacts of contacts 2-Z1-1, releasing relay 2-W1. Relay 2-Z1 is maintained operated, however, by way of the break contacts of contacts 2-W1-1 and make contacts 2-TM4-3. The subsequent release of relay 2-TM4 opens the holding path for relay 2-Z1 whereby the relay releases. The release of relay 2-Z1 reoperates relays 2-OC0 through 2-OC4 and releases relays 2-IC0 through 2-IC4. The release of relays 2-IC0 through 2-IC4 re-extends the windings of register relays 2-A00 through 2-A99 to leads 00 through 99, respectively, whereby alarm indications are registered in the 2-A register relays for the next 30 seconds. In addition, relay 2-OC0 operated, completes a path from battery by way of the winding of relay 3-GS, break contacts 2-BPC-1, break contacts 2-APC-2, the break contacts of contacts 3-GE-2, the make contacts of contacts 2-OC0-1 and make contacts 2-BS-4. The operation of relay 3-GS, as described hereinafter, now effects the printing of alarm indications registered in the 2-B register relays followed by the release of the operated ones of the 2-B register relays, the operated ones of relays 2-BS1 through 2-BS5, relay 2-BS and relay 3-GS. The circuit is now restored to the initial condition.

*Initiation of Printing Operation*

As previously stated, the operation of relay 3-GS initiates the printing of the alarm indication. Relay 3-GS operated, completes a path from battery by way of the winding of relay 3-GDK, the break contacts of contacts 3-G5-1, 3-G4-1, 3-G3-1, 3-G2-1, 3-G1-1 and 4-PL-1, and make contacts 3-GS-3 to ground, operating relay 3-GDK. Relay 3-GS operated, also completes a path from battery by way of the winding of slow-to-release relay 3-TMG, the break contacts of contacts 3-GC-1 and make contacts 3-GS-4 to ground. Relay 3-GS operated, also completes a path from battery by way of the winding of relay 3-WG1, the break contacts of continuity contacts 3-WG2-1, the break contacts of contacts 3-GA-1 and make contacts 3-GS-2 to ground, operating relay 3-WG1 which locks by way of the break contacts of contacts 3-WG2-1, make contacts 3-WG1-1 and make contacts 3-GS-2. Relay 3-GS operated, also completes a path from battery by way of the winding of slow-to-release relay 4-TSS, FIG. 4, break contacts 4-TS-1 and make contacts 3-GS-8. In addition, relay 3-GS operated, completes a path from battery by way of the winding of relay 8-PMT, FIG. 8, and make contacts 3-GS-9. Relay 8-PMT, in turn, completes an obvious energizing path for printer-distributor motor 811 by way of make contacts 8-PMT-1 whereby motive power is provided to typing unit 812 and distributor unit 813.

Figure 3:
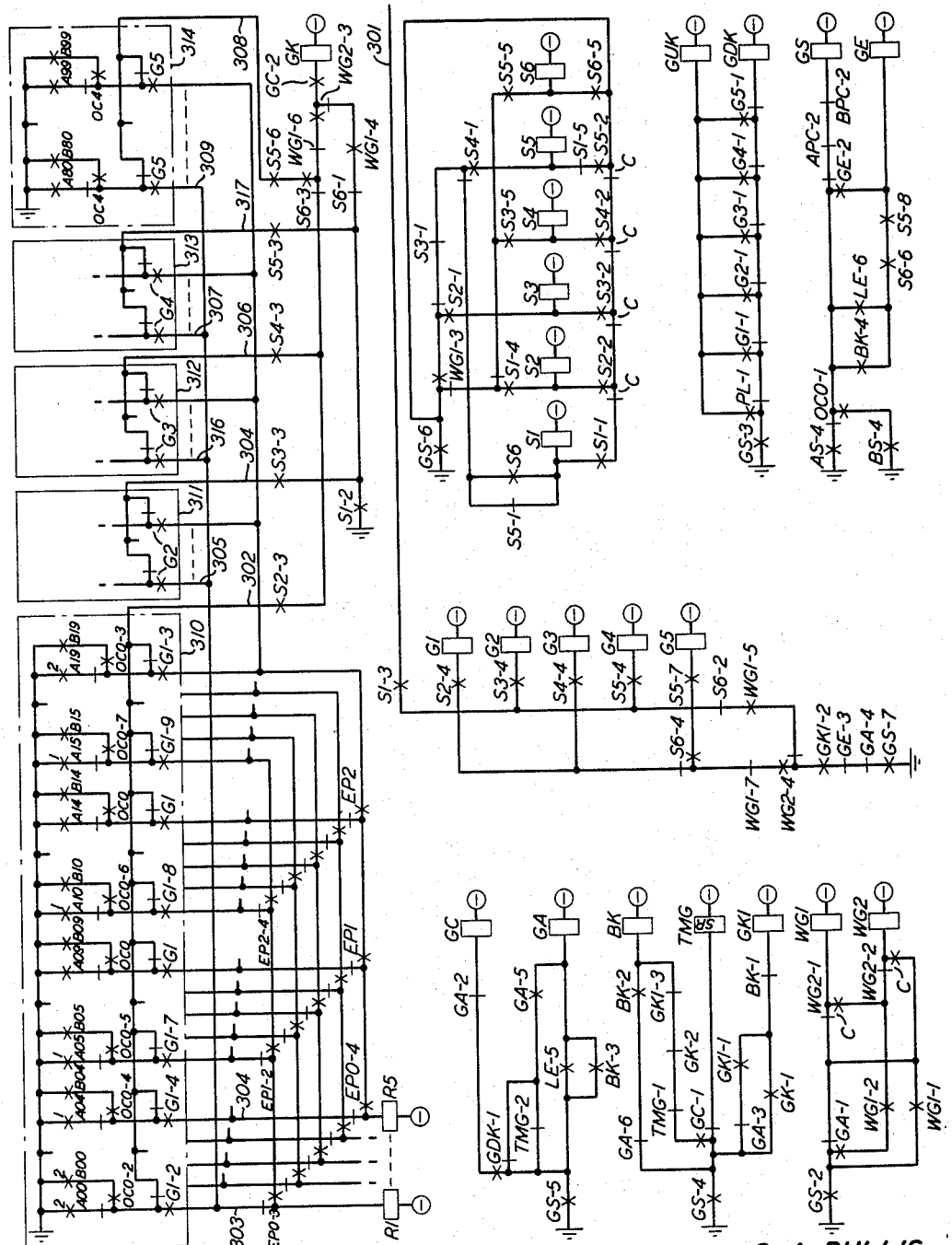

Relay 3-GDK operated, completes a path from battery by way of the winding of relay 3-GC, FIG. 3, break contacts 3-GA-2, the make contacts of contacts 3-GDK-1, and make contacts 3-GS-5. Relay 3-GC operated, opens the previously-described operating path for slow-to-release relay 3-TMG and the relay releases.

Returning now to the operation of relay 3-WG1, a path is completed from ground by way of make contacts 3-GS-6, the make contacts of contacts 3-WG1-3, the break contacts of contacts 3-S2-1, break contacts 3-S3-1, the break contacts of contacts 3-S4-1, break contacts 3-S5-1, and the winding of relay 3-S1 to battery, operating relay 3-S1 which locks by way of make contacts 3-S1-1, the break contacts of continuity contacts 3-S2-2, 3-S3-2, 3-S4-2 and 3-S5-2, and make contacts 3-GS-6. It is noted that relay 3-S1 constitutes the first relay stage of a counter which is arranged substantially in the same manner as pulse counter 505.

Relay 3-S1 operated, completes a path from ground via make contacts 3-S1-2, break contacts 3-S6-1, make contacts 3-WG1-4, the break contacts of contacts 3-WG2-3, make contacts 3-GC-2 and the winding of relay 3-GK to battery, operating the relay. Relay 3-GK operated, completes a path from ground via make contacts 3-GS-4, make contacts 3-GK-1, break contacts 3-BK-1 and the winding of relay 3-GK1 to battery, operating the relay which locks by way of make contacts 3-GK1-1 and break contacts 3-GA-3. Relay 3-GK1 operated, completes a path from ground via make contacts 3-GS-7, FIG. 3, break contacts 3-GA-4, break contacts 3-GE-3, make contacts 3-GK1-2, the break contacts of contacts 3-WG2-4, make contacts 3-WG1-5, break contacts 3-S6-2, make contacts 3-S1-3, lead 301, break contacts 2-TM2-3, FIG. 4, break contacts 2-TM3-2 and the winding of relay 4-PL to battery, operating the relay which locks by way of make contacts 4-PL-2 and break contacts 4-LE-1.

Relay 4-PL operated, completes an obvious operating path for relay 4-LS by way of make contacts 4-PL-3. Relay 4-PL operated also opens the previously-described operating path for relay 3-GDK and completes an operating path for relay 3-GUK by way of the make contacts of contacts 4-PL-1 and make contacts 3-GS-3 releasing relay 3-GDK and operating relay 3-GUK. Relay 3-GUK operated, completes an obvious holding circuit for relay 4-LS by way of make contacts 3-GUK-1.

Relay 4-LS operated, completes an obvious holding path for relay 8-PMT by way of make contacts 4-LS-3. In addition, relay 4-LS operated, completes an operating path for relay 4-TP0 by way of break contacts 4-LE-2, break contacts 4-EP2-1, break contacts 4-EP1-1, the break contacts of contacts 4-EP0-2, the break contacts of contacts 4-TE-1 and make contacts 4-LS-1 and relay 4-TP0 locks by way of make contacts 4-TP0-1, the break contacts of contacts 4-TP1-1, 4-TP2-1 and 4-TP3-1 and make contacts 4-LS-1. Relay 4-TP0 operated, completes an operating path for relay 4-TS by way of break contacts 4-TP3-2, break contacts 4-TP2-2, break contacts 4-TP1-2, make contacts 4-TP0-2, break contacts 4-TE-2 and make contacts 4-LS-2.

Returning now to the release of relay 3-GDK, the previously-described operating path for relay 3-GC is opened, releasing relay 3-GC which in turn opens the previously-described operating path for relay 3-GK. In addition, the release of relay 3-GC recompletes the previously-described operating path for relay 3-TMG.

The operation of relay 4-TS opens the previously-described operating path for slow-to-release relay 4-TSS. In addition, relay 4-TS operated, completes an operating path for relay 4-WT1 by way of the break contacts of continuity contacts 4-WT2-1, the break contacts of contacts 4-TA-1 and make contacts 4-TS-2, operating relay 4-WT1 which locks by way of the break contacts of contacts 4-WT2-1, make contacts 4-WT1-1 and make contacts 4-TS-2.

Relay 4-WT1 provides ground to the even or odd input of pulse counter 401 which is advanced in substantially the same manner as pulse counter 505. Accordingly, with relay 4-WT1 operated, a path is completed from ground by way of make contacts 4-TS-3 and the make contacts of contacts 4-WT1-3 to the odd input of counter 401 whereby counter relay 4-T1 is operated.

*Printing the Time-of-Day Entries*

When slow-to-release relay 4-TSS releases, a path is completed from battery by way of the winding of relay 4-TA, break contacts 7-TAB-1, 7-CR-1, 7-SP-1 and 7-PN-1, the break contacts of relays 7-EFS and 7-EF0 through 7-EF9, break contacts 4-TSS-1, break contacts 8-DC-1 and make contacts 4-TS-4 to ground, operating relay 4–TA which locks via make contacts 4–TA–2, break contacts 8–DC–1 and make contacts 4–TS–4. The release of relay 4–TSS also completes a path from battery by way of the winding of relay 4–TBS, break contacts 4–TSS–2, the break contacts of contacts 3–R5–1, 3–R4–1, 3–R3–1, 3–R2–1, and 3–R1–1, make contacts 3–GUK–2 and make contacts 4–TS–6, operating relay 4–TBS which locks by way of make contacts 4–TBS–1 which shunts break contacts 4–TSS–2. In addition, the release of relay 4–TSS completes a path from ground by way of make contacts 4–TS–7, FIG. 8, break contacts 4–TE–3, break contacts 4–TSS–3, the normally closed tabulate contacts 808 of printer 812 and the winding of clutch magnet 809 of distributor 813 to battery, releasing distributor 813 for rotation.

The operation of relay 4–TA provides a locking path for relay 4–TS by way of make contacts 4–TS–5, make contacts 4–TA–3 and make contacts 4–LS–2. Relay 4–TA operated, extends ground by way of make contacts 4–TS–2, the make contacts of contacts 4–TA–1, make contacts 4–WT1–2, the break contacts of continuity contacts 4–WT2–2 and the winding of relay 4–WT2 to battery, operating relay 4–WT2 which locks via the make contacts of contacts 4–WT2–2, make contacts 4–WT1–1 and make contacts 4TS–2. In addition, the operation of relay 4–TA with relay 4–T1 operated, as previously described, completes a path from ground via make contacts 4–TS–8, FIG. 7, break contacts 4–TSS–4, make contacts 4–TA–4, the break contacts of transfer contacts 4–T7–1, make contacts 4T1–1, the break contacts of contacts 4–FC–1, lead 701, make contacts 4–TP0–3, FIG. 6, lead 601 and the winding of relay 7–CR, FIG. 7, to battery, operating relay 7–CR which locks by way of make contacts 7–CR–2, lead 620 and make contacts 4–TA–5.

Relay 7–CR codes distributor 813 with the character Carriage-Return by extending ground to the fourth segment or selecting element of distributor 813. This ground is extended by way of make contacts 7–CR–5, FIG. 8, to lead 804 which extends to the fourth segment. Accordingly, with distributor 813 released for rotation and the character Carriage-Return coded on the distributor, this character is sent by way of the common lead 814 to the winding of select magnet 807 of printer 812. As previously disclosed, printer 812 in response to the character Carriage-Return restores the typing carriage to the beginning of the line and advances the page one line.

Relay 7–CR operated also completes a holding path for distributor clutch magnet 809 by way of the break contacts of relays 7–EF0 through 7–EF9 and 7–EFS, break contacts 7–PN–2, break contacts 7–SP–2, make contacts 7–CR–4, break contacts 7–TAB–2 and make contacts 4–TA–6 which shunt break contacts 4–TE–3 and 4–TSS–3 in the previously-described energizing path for clutch magnet 809. In addition, relay 7–CR operated, completes a path from battery via the winding of relay 4–TSS, make contacts 7–CR–3 and make contacts 3–GS–8 or make contacts 4–PL–4 in shunt thereto to ground.

During the rotation of distributor 813 and more particularly during the transmission of the start element, auxiliary contacts 810 close, completing an operating path for relay 8–DC. Relay 8–DC operated, completes a holding path for relay 7–CR by way of make contacts 8–DC–2 which shunt make contacts 4–TA–5 in the previously-described locking path for relay 7–CR. In addition, relay 8–DC operated, opens the previously-described operating and locking paths for relay 4–TA by way of break contacts 8–DC–1 and relay 4–TA releases. The release of relay 4–TA opens the previously-described locking path for relay 4–WT1 by way of the make contacts of contacts 4–TA–1. Relay 4–WT2 remains locked to ground, however, by way of the make contacts of continuity contacts 4–WT2–2, the break contacts of contacts 4–TA–1 and make contacts 4–TS–2.

The release of relay 4–WT1 transfers ground from the odd to the even input of counter 401. Accordingly, as previously-described, relay 4–T2 operates and relay 4–T1 releases. During the transmission of the stop element of the character Carriage-Return, auxiliary contacts 810 reopen, releasing relay 8–DC which in turn opens the previously-described locking path for relay 7–CR by way of make contacts 8–DC–2 whereby relay 7–CR releases. The release of relay 7–CR opens the previously-described operating path for relay 4–TSS and slow-to-release relay 4–TSS releases.

When relay 4–TSS releases, the previously-described energizing path for clutch magnet 809 by way of break contacts 4–TSS–3 is recompleted and the distributor is released for a second rotation. In addition, relay 4–TSS released, recompletes the previously-described operating path for relay 4–TA by way of break contacts 4–TSS–1. Relay 4–TA operated, opens the previously-described locking path for relay 4–WT2 by way of the break contacts of contacts 4–TA–1 and relay 4–WT2 releases. In addition, relay 4–TA operated, completes a path from ground via make contacts 4–TS–8, FIG. 7, break contacts 4–TSS–4, make contacts 4–TA–4, the break contacts of contacts 4–T7–1, make contacts 4–T2–1, the break contacts of contacts 4–FC–2, lead 702, make contacts 4–TP0–4, FIG. 6, lead 602 and the winding of relay 7–PN, FIG. 7, to battery, operating relay 7–PN which locks by way of make contacts 7–PN–3, lead 620 and make contacts 4–TA–5. Relay 7–PN operated, codes distributor 813 with the character Figures by extending ground to leads 801, 802, 804 and 805 by way of the make contacts of relay 7–PN. Accordingly, with distributor 813 released for the second rotation, the character Figures is applied to select magnet 807 by way of common lead 814 whereby the typing mechanism is placed in the "figures" or upper-case condition to print the subsequent number characters. In addition, relay 7–PN operated, completes a holding path for clutch magnet 809 by way of the break contacts of relays 7–EF0 through 7–EF9 and 7–EFS, make contacts 7–PN–2, break contacts 7–SP–2, break contacts 7–CR–2, break contacts 7–TAB–2 and make contacts 4–TA–6 which shunt break contacts 4–TE–3 and 4–TSS–3 in the previously-described energizing path for clutch magnet 809.

During the transmission of the start element of the character Figures, auxiliary contacts 810 close, operating relay 8–DC which in turn releases relay 4–TA as previously described. The release of relay 4–TA recompletes the previously-described operating path for relay 4–WT1 by way of the break contacts of contacts 4–TA–1. Relay 4–WT1 operated, transfers ground from the even to the odd input of counter 401 whereby relay 4–T3 is operated and relay 4–T2 is released.

During the transmission of the stop element of the character Space, auxiliary contacts 810 reopen, releasing relay 8–DC which in turn opens the previously-described locking path for relay 7–PN via make contacts 8–DC–2. The release of relay 7–PN recompletes the previously-described operating path for relay 4–TA by way of break contacts 7–PN–1.

Since at this time relay 4–TS is operated and relay 4–TSS remains released, clutch magnet 809 is maintained energized whereby distributor 813 is released for another rotation.

Returning now to the operation of relay 4–TA, the previously-described operating path for relay 4–WT2 is recompleted by way of the make contacts of contacts 4–TA–1. In addition, relay 4–TA operated, extends ground by way of make contacts 4–TS–8, FIG. 7, break contacts 4–TSS–4, make contacts 4–TA–4, the break contacts of contacts 4–T7–1, make contacts 4–T3–1 and the break contacts of contacts 4–FC–3, lead 703 and make contacts 4–TP0–5 to the make contacts of relays 5–HT0 through 5–HT2. This ground is extendible through make contacts 5–HT0–3, 5–HT1–4 or 5–HT2–4 in parallel to lead 610, 611 or 612, respectively. Leads 610 through 612 in turn extend to the windings of relays 7–EF0 through 7-EF2, respectively. It is recalled that one of relays 5-HT0 through 5-HT2 is operated in accordance with the hour-tens count. Accordingly, relay 7-EF0, 7-EF1 or 7-EF2 is operated in accordance with the 5-HT relay operated. Assuming relay 5-HT0 is operated, the above-described ground is extended by way of make contacts 5-HT0-3 and lead 610 to the winding of relay 7-EF0 which locks via make contacts 7-EF0-2, lead 620 and make contacts 4-TA-5.

The operation of relay 7-EF0 applies ground to leads 802, 803 and 805 by way of its make contacts whereby distributor 813 is coded with the upper-case number character 0. Since distributor clutch magnet 809 is maintained energized, as previously described, this character is applied to select magnet 807 of printer 812. It is recalled that printer 812 is shifted to the "figures" or upper-case condition. Accordingly, printer 812 prints the number 0 in the first character position of the first line, which number 0 designates the hour-tens count.

During the transmission of the start element, auxiliary contacts 810 close, operating relay 8-DC which in turn releases relay 4-TA as previously described. In addition, relay 8-DC completes a supplementary locking path for relay 7-EF0 by way of make contacts 8-DC-2. The release of relay 4-TA releases relay 4-WT1 which in turn transfers ground from the odd to the even input of pulse counter 401 as previously described. This operates relay 4-T4 and releases relay 4-T3.

During the transmission of the stop element, auxiliary contacts 810 reopen, releasing relay 8-DC which in turn opens the previously-described locking path for relay 7-EF0 and this relay releases. The release of relay 7-EF0 recompletes the previously-described operating path for relay 4-TA by way of the break contacts of relay 7-EF0 and relay 4-TA operates.

Relay 4-TA operated, opens the previously-described locking path for relay 4-WT2 by way of the break contacts of contacts 4-TA-1 and relay 4-WT2 releases. In addition, relay 4-TA operated, extends ground by way of make contacts 4-TS-8, break contacts 4-TSS-4, make contacts 4-TA-4, the break contacts of contacts 4-T7-1, make contacts 4-T4-1, the break contacts of contacts 4-FC-4, lead 704, and make contacts 4-TP0-6, FIG. 6, to contacts 5-HU6-2. This ground is extendible by way of contacts 5-HU6-2, the make contacts of relays 5-HU1 through 5-HU5 and leads 610 through 619 to the windings of relays 7-EF0 through 7-EF9. It is recalled that relays 5-HU1 through 5-HU6 of pulse counter 509 provide a count of the hour-units. Accordingly, one of relays 7-EF0 through 7-EF9 is operated in accordance with the hour-units count.

Assuming now that pulse counter 509 is in the initial condition, the ground is extended by way of the break contacts of contacts 5-HU6-2, make contacts 5-HU1-1 and lead 610 to the winding of relay 7-EF0, operating relay 7-EF0 which locks and codes distributor 813 with the character 0, as previously described, whereby printer 812 prints the hour-units count in the second character position.

During the transmission of the start element, auxiliary contacts 810 close operating relay 8-DC which in turn releases relay 4-TA. The release of relay 4-TA operates relay 4-WT1, as previously described, and relay 4-WT1 in turn advances pulse counter 401 to operate relay 4-T5 and release relay 4-T4.

During the transmission of the stop element, auxiliary contacts 810 reopen, releasing relay 8-DC which in turn releases relay 7-EF0. The release of relay 7-EF0 reoperates relay 4-TA as previously described.

Relay 4-TA operated, reoperates relay 4-WT2. In addition, the operation of relay 4-TA extends ground via make contacts 4-TS-8, break contacts 4-TSS-4, make contacts 4-TA-4, the break contacts of contacts 4-T7-1, make contacts 4-T5-1, the break contacts of contacts 4-FC-5, lead 705, and make contacts 4-TP0-7, FIG. 6, to contacts 5-MT4-2.

It is recalled that relays 5-MT1 through 5-MT4 of pulse counter 507 provide a minute-tens count. Accordingly, the ground is extended to one of leads 610 through 615 in accordance with the count of pulse counter 507. Assuming pulse counter 507 is in the initial condition this ground is extended by way of the break contacts of contacts 5-MT4-2 and make contacts 5-MT1-1 to lead 610 whereby relay 7-EF0 operates and locks as previously described. Relay 7-EF0 operated, codes distributor 813 with the upper-case number character 0 whereby printer 812 prints the minute-tens number count in the third character position.

During the transmission of the start element, auxiliary contacts 810 close, operating relay 8-DC which in turn releases relay 4-TA. Relay 4-TA released, releases relay 4-WT1 advancing counter 401 whereby relay 4-T6 is operated and relay 4-T5 is released.

During the transmission of the stop element, auxiliary contacts 810 reopen, releasing relay 8-DC which in turn releases relay 7-EF0 as previously described. The release of relay 7-EF0 recompletes the operating path for relay 4-TA as previously described.

Relay 4-TA operated, releases relay 4-WT2 as previously described. In addition, the operation of relay 4-TA extends ground by way of make contacts 4-TS-8, break contacts 4-TSS-4, make contacts 4-TA-4, the break contacts of contacts 4-T7-1, make contacts 4-T6-1, the break contacts of contacts 4-FC-6, lead 706, make contacts 4-TP0-8, FIG. 6, to contacts 5-MU6-2.

It is recalled that relays 5-MU1 through 5-MU6 of pulse counter 505 provide the minute-units count. Accordingly, the ground is extended to one of leads 610 through 619 in accordance with the count of pulse counter 505. Assuming that pulse counter 505 is in the initial condition, the ground is extended by way of the break contacts of contacts 5-MU6-2 and make contacts 5-MU1-1 to lead 610 whereby relay 7-EF0 operates and locks as previously described. The operation of relay 7-EF0 codes distributor 813 with the upper-case number character 0 whereby printer 812 prints the minute-units count in the fourth character position.

During the transmission of the start element, auxiliary contacts 810 close, operating relay 8-DC which releases relay 4-TA as previously described. The release of relay 4-TA operates relay 4-WT1 which advances counter 401 by transferring ground from the even input lead to the odd input lead. This operates relay 4-T7. As previously described relay 4-T7 locks by way of make contacts 4-TS-3. In addition, since the ground is applied to the odd input lead, relay 4-T1 operates and relay 4-T6 releases.

During the transmission of the stop element, auxiliary contacts 810 reopen, releasing relay 8-DC which in turn releases relay 7-EF0 as previously described. The release of relay 7-EF0 recompletes the operating path for relay 4-TA.

Relay 4-TA operated, reoperates relay 4-WT2 as previously described. In addition, the operation of relay 4-TA extends ground by way of make contacts 4-TS-8, break contacts 4-TSS-4, make contacts 4-TA-4, the make contacts of contacts 4-T7-1, make contacts 4-T1-2, the break contacts of contacts 4-FC-7, lead 707 and make contacts 4-TP0-9, FIG. 6, to contacts 5-WS2-3.

It is recalled that relay 5-WS2 together with relay 5-WS1 of flip-flop 503 provides a 30-second or one-half minute count. Accordingly, the ground is extendible to lead 610 or 615 in accordance with the one-half minute count.

Assuming that flip-flop circuit 503 is in the initial condition, the ground is extended by way of the break contacts of contacts 5-WS2-3 to lead 610 whereby relay 7-EF0 operates and locks as previously described. The operation of relay 7-EF0 codes distributor 813 with the upper-case number character 0 whereby printer 812 prints the one-half minute count in the fifth character position.

During the transmission of the start element, auxiliary contacts 810 close, operating relay 8–DC which in turn releases relay 4–TA and relay 4–TA in turn releases relay 4–WT1 as previously described. The release of relay 4–WT1 advances counter 401 whereby relay 4–T2 is operated and relay 4–T1 is released.

During the transmission of the stop element auxiliary contacts 810 reopen, releasing relay 8–DC which in turn releases relay 7–EF0 and relay 7–EF0 reoperates relay 4–TA as previously described.

Relay 4–TA operated, releases relay 4–WT2 as previously described. In addition, the operation of relay 4–TA completes a path from ground by way of make contacts 4–TS–8, break contacts 4–TSS–4, make contacts 4–TA–4, the make contacts of contacts 4–T7–1, make contacts 4–T2–2, the break contacts of contacts 4–FC–8, lead 708, make contacts 4–TP0–10, FIG. 6, lead 603 and the winding of relay 7–SP to battery, operating relay 7–SP which locks by way of make contacts 7–SP–3, lead 620 and make contacts 4–TA–5. The operation of relay 7–SP extends ground to lead 803 by way of make contacts 7–SP–4 whereby distributor 813 is coded with the character Space. The reception of the character Space by select magnet 807 of printer 812 functions to advance the typing mechanism one character position and to restore the carriage to the lower-case position.

During the transmission of the start element, auxiliary contacts 810 close, operating relay 8–DC which in turn releases relay 4–TA and completes an auxiliary locking path for relay 7–SP by way of make contacts 8–DC–2. The release of relay 4–TA operates relay 4–WT1 and relay 4–WT1 advances counter 401 to operate relay 4–T3 and release relay 4–T2.

During the transmission of the stop element, auxiliary contacts 810 reopen, releasing relay 8–DC which in turn opens the previously-described locking path for relay 7–SP. The release of relay 7–SP recompletes the previously-described operating path for relay 4–TA via break contacts 7–SP–1.

Relay 4–TA operated, recompletes the previously-described operating path for relay 4–WT2. In addition, the operation of relay 4–TA completes a path from ground by way of make contacts 4–TS–8, break contacts 4–TSS–4, make contacts 4–TA–4, the make contacts of contacts 4–T7–1, make contacts 4–T3–2, the break contacts of contacts 4–FC–9, lead 709, make contacts 4–TP0–11, FIG. 6, lead 601 and the winding of relay 7–CR to battery, operating relay 7–CR which locks as previously described. The operation of relay 7–CR codes the character Carriage-Return on distributor 813 and the reception thereof by printer 812, restores the type carriage to the first character position and advances the page record to the next line as previously described.

This completes printing of the time-of-day designations in the first line. The circuit is now prepared to print the alarm designations starting on the second line.

Returning now to relay 4–TA operated, a path is completed by way of make contacts 4–TA–7, FIG. 4, make contacts 4–TP0–12, the make contacts of contacts 4–PL–5, make contacts 4–T3–3, the make contacts of contacts 4–T7–2 and the winding of relay 4–TE to battery, operating relay 4–TE which locks by way of make contacts 4–TE–4, 4–TE–5 and 4–TA–7. Relay 4–TE operated, extends ground via make contacts 4–TE–7, which shunt contacts 4–LS–1, in the previously-described operating path for relay 4–TP0. In addition, relay 4–TE operated, completes a path via make contacts 4–TE–7, the make contacts of contacts 4–TE–1, make contacts 4–TP0–13, the make contacts of contacts 4–PL–6 and the winding of relay 4–LE to battery, operating relay 4–LE which locks by way of make contacts 4–LE–3 and make contacts 4–TE–7. Relay 4–TE operated, opens, the previously-described operating path for relay 4–TS by way of break contacts 4–TE–2 and completes an operating path for relay 4–TSS by way of make contacts 4–TE–6 and make contacts 3–GS–8.

Relay 4–LE operated, opens the previously-described locking path for relay 4–PL by way of break contacts 4–LE–1. Relay 4–LE operated also completes an operating path for relay 3–GA by way of make contacts 4–LE–5 and 3–GS–5. In addition, relay 4–LE operated, completes an operating path for relay 4–PF by way of make contacts 4–LE–4 and 3–GS–10 and relay 4–PF locks via make contacts 4–PF–1 and make contacts 3–GS–10.

The operation of relay 3–GA opens the previously-described operating path for relay 4–PL by way of break contacts 3–GA–4 and relay 4–PL releases. Relay 3–GA operated also opens the previously-described locking path for relay 3–GK1 by way of break contacts 3–GA3 and relay 3–GK1 releases. In addition, relay 3–GA operated, completes the operating path for relay 3–WG2 by way of the break contacts of continuity contacts 3–WG2–2, make contacts 3–WG1–2, the make contacts of contacts 3–GA–1 and make contacts 3–GS–2, operating relay 3–WG2 which locks by way of the make contacts of contacts 3–WG2–2, make contacts 3–WG1–1 and make contacts 3–GS–2.

Relay 4–PF operated, completes an operating path for relay 4–FC by way of make contacts 4–PF–2 and make contacts 3–GS–8. In addition, relay 4–PF operated, completes an operating path for relay 4–HC by way of break contacts 4–EP0–1, make contacts 4–PF–2 and make contacts 3–GS–8.

The release of relay 4–PL opens the previously-described operating path for relay 3–GUK by way of the make contacts of contacts 4–PL–1 and relay 3–GUK releases. In addition, the release of relay 4–PL completes an operating path for relay 3–GDK by way of the break contacts of contacts 3–G5–1, 3–G4–1, 3–G3–1, 3–G2–1, 3–G1–1 and 4–PL–1, and make contacts 3–GS–3 whereby relay 3–GDK operates.

The release of relay 3–GUK opens the previously-described holding path for relay 4–LS by way of make contacts 3–GUK–1 and relay 4–LS releases. In addition, the release of relay 3–GUK opens the previously-described operating path for relay 4–TBS by way of make contacts 3–GUK–2 and relay 4–TBS releases.

Returning now to the transmission of the character Carriage-Return, during the transmission of the start element, auxiliary contacts 810 close, operating relay 8–DC which in turn releases relay 4–TA. In addition relay 8–DC operated, completes a supplementary locking path for relay 4–TE by way of make contacts 8–DC–3 which shunt make contacts 4–TE–5 and 4–TA–7 in the previously-described locking path for relay 4–TE. The release of relay 4–TA opens the previously-described locking path for relay 4–TS by way of make contacts 4–TA–3 and relay 4–TS releases.

The release of relay 4–TS opens the input and holding ground applied to pulse counter 401 by way of make contacts 4–TS–3 whereby relays 4–T7 and 4–T3 release. In addition, the release of relay 4–TS opens the previously-described operating and locking paths for relays 4–WT1 and 4–WT2 by way of make contacts 4–TS–2 and these relays release. During the transmission of the stop element, auxiliary contacts 810 reopen, releasing relay 8–DC which in turn releases relay 7–CR as previously described. In addition, the release of relay 8–DC opens the previously-described locking path for relay 4–TE and relay 4–TE releases. The release of relay 4–TE opens the previously-described locking paths for relays 4–TP0 and 4–LE and these relays release.

The release of relay 4–LE opens the previously-described operating path for relay 3–GA by way of make contacts 4–LE–5 and relay 3–GA releases. Relay 3–GA released, opens the previously-described locking path for relay 3–WG1, and relay 3–WG1 released, completes a path from ground by way of make contacts 3–GS–6, the break contacts of contacts 3–WG1–3, the make contacts of contacts 3-S1-4 and the winding of relay 3-S2 to battery, operating relay 3-S2 which locks by way of the make contacts of continuity contacts 3-S2-2, the break contacts of continuity contacts 3-S3-2, 3-S4-2 and 3-S5-2, and make contacts 3-GS-6. Relay 3-S2 operated, opens the previously-described locking path for relay 3-S1 via the break contacts of continuity contacts 3-S2-2 and relay 3-S1 releases.

*Scanning the Alarm Registrations*

Returning now to relay 3-GA released, an operating path is completed from battery by way of the winding of relay 3-GC, break contacts 3-GA-2, the make contacts of contacts 3-GDK-1 and make contacts 3-GS-5 operating relay 3-GC. Relay 3-GC operated, opens the previously-described operating path for slow-to-release relay 3-TMG by way of the break contacts of contacts 3-GC-1 and relay 3-TMG starts to release.

With the operation of relay 3-GC, relay 3-GK simultaneously scans the register relay contacts of the register relays associated with Section 1 cabinet 201. These contacts are generally indicated in block 310 and comprise the contacts of relays 2-A00 through 2-A19 and 2-B00 through 2-B19. With relays 2-OC0 through 2-OC4 operated in parallel, as previously described, it is noted that in block 310 ground is extendible in parallel through make contacts of relays 2-A00 through 2-A19 and break contacts of relay 2-OC0 to the contacts of relay 3-G1.

The arrangement generally shown as block 311 comprises the contacts of register relays 2-A20 through 2-A39 and 2-B20 through 2-B39 arranged in a manner similar to block arrangement 310 whereby with relay 2-OC1 operated, ground is extendible in parallel through the make contacts of relays 2-A20 through 2-A39 and the break contacts of relay 2-OC1 to the contacts of relay 3-G2. Similarly, block 312 includes the make contacts of relay 2-A40 through 2-A59 and 2-B40 through 2-B59 and arranged similarly to block 310 whereby with relay 2-OC2 operated, ground is similarly extended to the contacts of relay 3-G3. In the same manner block 313 includes the contacts of relays 2-A60 through 2-A79 and 2-B60 through 2-B79 and block 314 includes the contacts of relays 2-A80 through 2-A99 and relays 2-B80 through 2-B99 whereby with relays 2-OC3 and 2-OC4 operated, ground is similarly extendible to the contacts of relays 3-G4 and 3-G5, respectively.

Returning now to relay 3-GC operated, a path is extended from battery by way of the winding of relay 3-GK, make contacts 3-GC-2, the make contacts of contacts 3-WG2-3, the break contacts of contacts 3-S6-3 and make contacts 3-S2-3 to lead 302. Lead 302 in turn extends in parallel by way of the break contacts of relay 3-G1 to the above-described contacts of relays 2-A00 through 2-A19. Assuming that relay 2-A00 is operated, as previously described, ground is thus supplied by way of make contacts 2-A00-2, the break contacts of contacts 2-OC0-2 and the break contacts of contacts 3-G1-2 to lead 302. In the event that relay 2-A19 is operated, ground is applied by way of make contacts 2-A19-2, the break contacts of contacts 2-OC0-3 and the break contacts of contacts 3-G1-3 to lead 302. Accordingly, in the event that one or more of relays 2-A00 through 2-A19 is operated, ground is applied to lead 302 whereby relay 3-GK operates.

In the event, however, that none of relays 2-A00 through 2-A19 is operated, relay 3-GK does not operate and upon the subsequent release of relay 3-TMG, as previously described, a path is completed from ground by way of make contacts 3-GS-4, the make contacts of contacts 3-GC-1, break contacts 3-TMG-1, break contacts 3-GK-2, break contacts 3-GK1-3 and the winding of relay 3-BK to battery, operating relay 3-BK which locks by way of make contacts 3-BK-2, break contacts 3-GA-6 and make contacts 3-GS-4. Relay 3-BK operated, initiates the action of the circuit to advance to the scanning of the register relay contacts of block 311 as described hereinafter.

Returning now to the relay 3-GK which, it is assumed, has operated in response to the scanning of an operated one of relays 2-A00 through 2-A19, a path is completed from ground by way of make contacts 3-GS-4, make contacts 3-GK-1, break contacts 3-BK-1 and the winding of relay 3-GK1 to battery, operating relay 3-GK1 which locks by way of make contacts 3-GK1-1 and break contacts 3-GA-3 which shunts make contacts 3-GK-1 in the previously-described operating path for relay 3-GK1. Relay 3-GK1 operated, completes a path from battery by way of the winding of relay 3-G1, make contacts 3-S2-4, the break contacts of contacts 3-S6-4, break contacts 3-WG1-7, the make contacts of contacts 3-WG2-4, make contacts 3-GK1-2, break contacts 3-GE-3, break contacts 3-GA-4 and make contacts 3-GS-7 to ground, operating relay 3-G1.

The operation of relay 3-G1 initiates the simultaneous scanning of the contacts of relays 2-A00 through 2-A04 which constitute the first subgroup of 2-A register relays in the Section 1 cabinet 201. Assuming that one or more of relays 2-A00 through 2-A04 are operated, a corresponding one or more of relays 3-R1 through 3-R5 are operated. For example, assuming that relay 2-A00 is operated, a path is completed from ground by way of make contacts 2-A00-2, the break contacts of contacts 2-OC0-2, the make contacts of contacts 3-G1-2, the break contacts of contacts 4-EP03 and the winding of relay 3-R1 to battery, operating relay 3-R1. Similarly, in the event that relay 2-A04 is operated, a path is completed from ground by way of make contacts 2-A04-1, the break contacts of contacts 2-OC0-4, the make contacts of contacts 3-G1-4 and the break contacts of contacts 4-EP0-4 and the winding of relay 3-R5 to battery, operating relay 3-R5. Conversely, if none of relays 2-A00 through 2-A04 is operated, none of relays 3-R1 through 3-R5 operates.

Returning now to relay 3-G1 operated, the previously-described operating path for relay 3-GK is open by way of the break contacts of contacts 3-G1-2, for example, and relay 3-GK releases. Relay 3-G1 operated also opens the previously-described operating path for relay 3-GDK by way of the break contacts of contacts 3-G1-1 and relay 3-GDK releases. Relay 3-GDK released, opens the previously-described operating path for relay 3-GC by way of the make contacts of contacts 3-GDK-1 and relay 3-GC releases. The release of relay 3-GC recompletes the previously-described operating path for relay 3-TMG and relay 3-TMG reoperates. In addition, relay 3-G1 operated, completes a path from battery by way of the winding of relay 3-GUK, the make contacts of contacts 3-G1-1, the break contacts of contacts 4-PL-1 and make contacts 3-GS-3 to ground, operating relay 3-GUK.

Relay 3-GUK operated, recompletes the previously-described operating path for relay 4-LS by way of make contacts 3-GUK-1 and relay 4-LS operates. Relay 4-LS operated, recompletes the previously-described operating path for relay 4-TP0 by way of make contacts 4-LS-1 and relay 4-TP0 operates. Relay 4-TP0 operated, recompletes the previously-described operating path for relay 4-TS by way of make contacts 4-TP0-2 and relay 4-TS operates.

The operation of relay 4-TS recompletes the previously-described operating path for relay 4-WT1 by way of make contacts 4-TS-2 and relay 4-WT1 operates. Relay 4-WT1 operated, extends ground to the odd input of counter 401 by way of the make contacts of contacts 4-WT1-3 whereby relay 4-T1 operates as previously described. With relay 4-TS operated, the previously described operating path for relay 4-TSS is open by way of break contacts 4-TS-1 and relay 4-TSS slowly releases.

In the event that an alarm is registered in one or more of relays 2-A00 through 2-A04 whereby one or more of relays 3-R1 or 3-R5 are operated, the operation of relay 4-TS completes a path from battery by way of the winding of relay 4-REG, the make contacts of contacts 3-R1-1, for example, make contacts 3-GUK-2 and make contacts 4-TS-6 to ground, operating relay 4-REG. If none of relays 3-R1 through 3-R5 is operated, however, the release of relay 4-TSS completes the previously-described operating path for relay 4-TBS and relay 4-TBS operates. Accordingly, relay 4-TBS is operated in the event that no alarm is scanned in the first subgroup and relay 4-REG is operated in the event that one or more alarms are scanned in the first subgroup.

*Printing the Alarm Registrations*

Returning now to relay 4-TSS, when the relay releases, as previously-described, the energizing path for clutch magnet 809 is recompleted by way of break contacts 4-TSS-3. In addition, the release of relay 4-TSS recompletes the previously-described operating path for relay 4-TA by way of break contacts 4-TSS-1. Relay 4-TA operated, recompletes the previously-described operating path for relay 4-WT2 by way of the make contacts of contacts 4-TA-1, operating relay 4-WT2 which locks by way of make contacts 4-WT1-1 as previously described. In addition, relay 4-TA operated, completes a path from ground by way of make contacts 4-TS-8, break contacts 4-TSS-4, make contacts 4-TA-4, the break contacts of contacts 4-T7-1, make contacts 4-T1-1, the make contacts of contacts 4-FC-1, the make contacts of contacts 4-HC-1, make contacts 3-G1-5 and the winding of relay 7-EFS to battery, operating relay 7-EFS which locks by way of make contacts 7-EFS-1 to ground on lead 620 in the same manner as previously described for relay 7-EF0. Relay 7-EFS operated, extends ground by way of the make contacts of relay 7-EFS to leads 801 and 803 whereby distributor 813 is coded with the character S. Since clutch magnet 809 has been energized, as previously described, the character S is thus provided to select magnet 807 whereby printer 812 prints the character S in the first character position of the second line.

During the transmission of the start element, the auxiliary contacts 810 close to operate relay 8-DC which in turn releases relay 4-TA as previously described. The release of relay 4-TA releases relay 4-WT1 which advances counter 401 to operate relay 4-T2 and release relay 4-T1 as previously described.

During the transmission of the stop element, auxiliary contacts 810 reopen, releasing relay 8-DC which releases relay 7-EFS in the same manner as previously described for the release of relay 7-EF0. Relay 7-EFS released, recloses the previously-described operating path for relay 4-TA by way of the break contacts of relay 7-EFS. Relay 4-TA operated, releases relay 4-WT2 as previously described. In addition, relay 4-TA operated, extends ground by way of make contacts 4-TS-8, break contacts 4-TSS-4, make contacts 4-TA-4, the break contacts of contacts 4-T7-1, make contacts 4-T2-1, the make contacts of contacts 4-FC-2 and the make contacts of contacts 4-HC-2 to lead 602 whereby relay 7-PN is operated and locks as previously described. As previously described, relay 7-PN operated, codes distributor 813 with the character Figures whereby the typing mechanism of printer 812 is set in the upper-case condition.

During the transmission of the start element, auxiliary contacts 810 close to operate relay 8-DC which in turn releases relay 4-TA. Relay 4-TA in turn operates relay 4-WT1 which advances counter 401 to operate relay 4-T3 and release relay 4-T2 as previously described.

During the transmission of the stop element, auxiliary contacts 810 reopen to release relay 8-DC which in turn releases relay 7-PN as previously described. The release of relay 7-PN reoperates relay 4-TA which in turn operates relay 4-WT2 as previously described. In addition, relay 4-TA operated extends ground by way of make contacts 4-TS-8, break contacts 4-TSS-4, make contacts 4-TA-4, the break contacts of contacts 4-T7-1, make contacts 4-T3-1, the make contacts of contacts 4-FC-3, the make contacts of contacts 4-HC-3 and make contacts 3-G1-6 to lead 611 which extends to the winding of relay 7-EF1, operating relay 7-EF1 which locks by way of make contacts 7-EF1-1 to ground on lead 620. Relay 7-EF1 operated, extends ground by way of the make contacts of relay 7-EF1 to leads 801, 802, 803 and 804 whereby distributor 813 is coded with the upper-case number character 1. Accordingly, printer 812 prints the number 1 in the second character position, completing the designation S1 for Section 1 cabinet 201.

During the transmission of the start element, auxiliary contacts 810 close, operating relay 8-DC which releases relay 4-TA. Relay 4-TA released, releases relay 4-WT1 which in turn advances counter 401 to operate relay 4-T4 and release relay 4-T3 as previously described.

During the transmission of the stop element, auxiliary contacts 810 reopen, releasing relay 8-DC which in turn releases relay 7-EF1. Relay 7-EF1 released, recompletes the operating path for relay 4-TA which in turn releases relay 4-WT2 as previously described. In addition, relay 4-TA operated, extends ground by way of make contacts 4-TS-8, break contacts 4-TSS-4, make contacts 4-TA-4, the break contacts of contacts 4-T7-1, make contacts 4-T4-1, the make contacts of contacts 4-FC-4 and the make contacts of contacts 4-HC-4 to lead 603 whereby relay 7-SP operates and locks as previously described.

The operation of relay 7-SP codes distributor 813 with the character Space and the application of the character Space to select magnet 807 restores the typing mechanism of printer 812 to the lower-case condition and advances the typing mechanism one character position as previously described. Accordingly, the typing mechanism is advanced past the third character position to the fourth character position.

During the transmission of the stop element, auxiliary contacts 810 close, operating relay 8-DC which in turn releases relay 4-TA. The release of relay 4-TA reoperates relay 4-WT1 which in turn advances counter 401 to operate relay 4-T5 and release relay 4-T4 as previously described.

During the transmission of the stop element, auxiliary contacts 810 reopen, releasing relay 8-DC which in turn releases relay 7-SP and relay 7-SP reoperates relay 4-TA which in turn reoperates relay 4-WT2 as previously described.

The circuit now proceeds to print the alarm indications registered in relays 3-R1 through 3-R5 by the first subgroup of register relays 2-A00 through 2-A04 or, in the alternative, to tabulate to the ninth character position and print a no-alarm indication for the subgroup in the event that none of relays 3-R1 through 3-R5 is operated.

Assuming that one or more of relays 3-R1 through 3-R5 are operated, relay 4-REG is operated as previously described. A ground is thus extended by way of make contacts 4-TS-8, break contacts 4-TSS-4, make contacts 4-TA-4, the break contacts of contacts 4-T7-1, make contacts 4-T5-1, the make contacts of contacts 4-FC-5, the make contacts of contacts 4-HC-5 and make contacts 4-REG-1 to lead 603. The application of ground to lead 603 operates relay 7-SP which locks, as previously described, and codes distributor 813 with the character Space whereby the printing mechanism of printer 812 is advanced one space to the fifth character position.

During the transmission of the start element, auxiliary contacts 810 close, operating relay 8-DC whereupon relay 4-TA releases and relay 4-WT1 releases to advance counter 401. This operates relay 4-T6 and releases relay 4-T5.

During the transmission of the stop element, auxiliary contacts 810 reopen, releasing relay 8-DC which in turn releases relay 7-SP. The release of relay 7-SP reoperates relay 4–TA which releases relay 4–WT2 as previously described. In addition, relay 4–TA operated, extends ground by way of make contacts 4–TS–8, break contact 4–TSS–4, make contacts 4–TA–4, the break contacts of contacts 4–T7–1, make contacts 4–T6–1, the make contacts of contacts 4–FC–6, the make contacts of contacts 4–HC–6 and make contacts 4–REG–2 to contacts 3–R1–2. If relay 3–R1 is operated in response to the registration of an alarm condition by relay 2–A00, the ground is extended by way of the make contacts of contacts R–R1–2 to lead 617. Alternately, if relay 3–R1 is released, the ground is extended by way of the break contacts of contacts 3–R1–2 to lead 619. Lead 617 extends to the winding of relay 7–EF7 which extends ground to distributor input leads 801, 802 and 803 and the printer mechanism of printer 812 responds thereto while in the lower-case condition by printing the letter X. Lead 619 extends to the winding of relay 7–EF9 which grounds distributor input leads 804 and 805 and printer 812 responds thereto while in the lower-case condition by printing the letter O. Accordingly, the letter O or X is printed in the fifth character position in accordance with the condition of register relay 2–A00.

During the transmission of the start element, auxiliary contacts 813 close, operatnig relay 8–DC which releases relay 4–TA. Relay 4–TA reoperates relay 4–WT1 which advances counter 401 to operate relay 4–T7, operate relay 4–T1 and release relay 4–T6 as previously described.

During the transmission of the stop element, relay 8–DC and relay 7–EF7 or 7–EF9 release, operating relay 4–TA which in turn operates relay 4–WT2. In addition, relay 4–TA operated, extends ground through the make contacts of contacts 4–T7–1, as previously described, and then by way of make contacts 4–T1–2, the make contacts of contacts 4–FC–7 and the make contacts of contacts 4–HC–7 to contacts 3–R2–2. The ground is then extended by way of the make contacts of contacts 3–R2–2 to lead 617 or by way of the break contacts of contacts 3–R2–2 to lead 619 whereby relay 7–EF7 or 7–EF9 is operated in accordance with the operated condition of relay 3–R2. Since relay 3–R2 is controlled by the operated condition of relay 2–A01, printer 812 prints the letter character X or O in the sixth character position in accordance with the condition of relay 2–A01.

During the transmission of the start element, relay 8–DC operates, relay 4–TA releases, relay 4–WT1 releases, relay 4–T2 operates and relay 4–T1 releases in sequence as previously described. During the transmission of the start element, relay 8–DC releases, relay 7–EF7 or 7–EF9 releases, relay 4–TA operates and relay 4–WT2 releases in sequence as previously described.

The operation of relay 4–TA extends ground by way of the make contacts of contacts 4–T7–1, as previously described, and then by way of make contacts 4–T2–2, the make contacts of contacts 4–FC–8 and the make contacts of contacts 4–HC–8 to contacts 3–R3–2. Since this ground is extended by way of the make contacts of contacts 3–R3–2 to lead 617 and by way of the break contacts of contacts 3–R3–2 to lead 619, the character X or O is printed in the seventh character position in accordance with the condition of relay 2–A03.

During the transmission of the start element, relay 8–DC operates, relay 4–TA releases, relay 4–WT1 operates, relay 4–T3 operates and relay 4–T2 releases in sequence as previously described. During the transmission of the stop element, relay 8–DC releases, relay 7–EF7 or 7–EF9 releases, relay 4–TA operates and relay 4–WT2 operates in sequence as previously described.

Relay 4–TA operated, extends ground by way of the make contacts of contacts 4–T7–1, previously described, and then by way of make contacts 4–T3–2 and the make contacts of contacts 4–FC–9 to contacts 3–R4–2. Since this ground is extended to lead 617 by way of the make contacts of contacts 3–R4–2 and to lead 619 by way of the break contacts of contacts 3–R4–2, the latter character X or O is printed in the eighth character position in accordance with the condition of relay 2–A03.

During the transmission of the start element, relay 8–DC operates, relay 4–TA releases, relay 4–WT1 releases, relay 4–T4 operates and relay 4–T3 releases in sequence as previously described. During the transmission of the stop element, relay 8–DC releases, relay 7–EF7 or 7–EF9 releases, relay 4–TA operates and relay 4–WT2 releases in sequence as previously described.

The operation of relay 4–TA completes a path from battery by way of the winding of relay 4–TE, the make contacts of contacts 4–T7–2, make contacts 4–T4–3, the break contacts of contacts 4–TBS–2, the break contacts of contacts 4–PL–5, make contacts 4–TP0–12 and make contacts 4–TA–7, operating relay 4–TE which locks by way of make contacts 4–TE–4, make contacts 4–TE–5 and make contacts 4–TA–7. Relay 4–TE operated, completes the previously-described operating path for relay 4–TSS by way of make contacts 4–TE–6. In addition, relay 4–TE operated, completes a path from battery by way of winding of relay 4–EP0, the break contacts of contacts 4–PL–6, make contacts 4–TP0–13, the make contacts of contacts 4–TE–1 and make contacts 4–LS–1, operating relay 4–EP0 which locks by way of make contacts 4–EP0–5 and make contacts 4–LS–1. Relay 4–EP0 operated, opens the previously-described operating path for relay 4–HC and the relay releases. In addition, relay 4–EP0 operated, transfers the operating path of relays 3–R1 through 3–R5 from the contacts of relays 2–A00 through 2–A04 to the contacts of relays 2–A05 through 2–A09. For example, the winding of relay 3–R1 now extends by way of the make contacts of contacts 4–EP0–3, the break contacts of contacts 4–EP1–2, the make contacts of contacts 3–G1–7 and the break contacts of contacts 2–OC0–5 to make contacts 2–A05–1. Accordingly, relays 3–R1 through 3–R5 now scan contacts 2–A0–5 through 2–A0–9.

Returning now to relay 4–TA operated prior to the operation of relay 4–TSS, ground is extended through the make contacts of contacts 4–T7–1, as previously described, and then by way of make contacts 4–T4–2 and make contacts 4–FC–10 to contacts 3–R5–2. This ground is extended by way of the make contacts of contacts 3–R5–2 and the break contacts of contacts 4–TP3–3 to lead 617 and is extended by way of the break contacts of contacts 3–R5–2 to lead 619 whereby the letter character X or O is printed in the ninth character position in accordance with the condition of relay 2–A04.

During the transmission of the start element, relay 8–DC operates, relay 4–TA releases and relay 4–WT1 operates, in sequence as previously described. Relay 8–DC operated, completes a supplementary locking path for relay 4–TE by way of make contacts 4–DC–3 which shunt make contacts 4–TE–5 and 4–TA–7 in the previously-described locking path for relay 4–TE. The release of relay 4–TA opens the previously-described locking path for relay 4–TS by way of make contacts 4–TA–3 and relay 4–TS releases. Relay 4–TS released, releases relays 4–T4, 4–T6 and 4–WT1 as previously described. In addition, the release of relay 4–TS opens the previously described locking path for relay 4–REG by way of make contacts 4–TS–6. Relay 4–TA released also opens the previously-described energizing path for clutch magnet 809 by way of make contacts 4–TS–7 whereby the distributor stops at the end of the cycle.

During the transmission of the stop element, relay 8–DC releases, releasing relay 7–EF7 or 7–EF9 as previously described. In addition, the release of relay 8–DC opens the previously-described locking path for relay 4–TE by way of make contacts 8–DC–3 and relay 4–TE releases. The release of relay 4–TE completes a path from battery by way of the winding of relay 4–TP1, the break contacts of contacts 4–EP1–3, the make contacts of contacts 4–EP0–2, the break contacts of contacts 4–TE–1 and make contacts 4–LS–1 to ground, operating relay 4–TP1 which locks by way of the make contacts of contacts 4–TP1–1, the break contacts of contacts 4–TP2–1 and 4–TP3–1 and make contacts 4–LS–1. Relay 4–TP1 operated, opens the previously-described locking path for relay 4–TP0 by way of the break contacts of contacts 4–TP1–1 and relay 4–TP0 releases. The circuit has now completed the printing of the alarm indications in the first subgroup in Section 1 cabinet 201.

Recalling now that the alarm indications in the first subgroup were printed when relay 4–REG is operated, in the event that no alarm conditions exist in the first subgroup, relay 4–REG is released and relay 4–TBS is operated as previously described. Accordingly, when relay 4–TS and 4–TBS operate followed by the operation of relay 4–TA, ground is extended by way of the break contacts of contacts 4–T7–1, as previously described, and then by way of make contacts 4–T5–1, the make contacts of contacts 4–FC–5, the make contacts of contacts 4–HC–5, make contacts 4–TBS–3 to the winding of relay 7–TAB, operating relay 7–TAB which locks by way of make contacts 7–TAB–3 to ground on lead 620. Relay 7–TAB operated, extends ground to distributor input leads 803 and 805 and the printing mechanism of printer 812 responds thereto by operating the tabulate function mechanism which in turn opens tabulate contacts 808 and advances the mechanism to the ninth character position. It is noted that during the tabulate action the energizing path of clutch magnet 809 is open precluding the subsequent rotation of distributor 813 until the printing mechanism advances to the ninth character position where tabulate contacts 808 reclose. In addition, relay 7–TAB operated, completes a path from battery by way of the winding of slow-to-release relay 4–TSS, make contacts 7–TAB–4 and make contacts 3–GS–8 to ground, operating relay 4–TSS.

During the transmission of the start element, relay 8–DC operates, relay 4–TA releases, relay 4–WT1 releases, relay 4–T6 operates and relay 4–T5 releases as previously described. During the transmission of the stop element, relay 8–DC releases removing ground from lead 620 whereby relay 7–TAB releases. The release of relay 7–TAB opens the previously-described operating path for relay 4–TSS and when relay 4–TSS releases, the previously-described operating path for relay 4–TA by way of break contacts 4–TSS–1 is recompleted whereby relay 4–TA operates, releasing in turn relay 4–WT2 as previously described.

Relay 4–TA operated, extends ground by way of the break contacts of contacts 4–T7–1, as previously described, and then by way of make contacts 4–T6–1, the make contacts of contacts 4–FC–6, the make contacts of contacts 4–HC–6 and make contacts 4–TBS–4 to lead 619 whereby relay 7–EF9 is operated and the letter O is printed in the ninth character position as previously described. Accordingly, with no alarm conditions registered in the first subgroup, printer 812 tabulates to the ninth character position and prints the letter character O.

In addition, relay 4–TA operated, completes a path from ground by way of the winding of relay 4–TE, the break contacts of contacts 4–T7–2, make contacts 4–T6–2, make contacts of contacts 4–TBS–2, the break contacts of contacts 4–PL–5, make contacts 4–TP0–12 and make contacts 4–TA–7 operating relay 4–TE which locks as previously described. Relay 4–TE operated, completes the previously-described operating path for slow-to-release relay 4–TSS and relay 4–EP0 and relay 4–EP0 in turn releases relay 4–HC as previously described.

During the transmission of the start element of the letter character O, relay 8–DC operates, relay 4–TA releases and relay 4–WT1 operates in sequence as previously described. In addition, relay 4–TA released, opens the previously-described energizing path for clutch magnet 809 whereby the distributor stops after this rotation. Relay 4–TA released also opens the previously-described locking path for relay 4–TS and relay 4–TS released, releases relays 4–T6 and 4–WT1 as previously described. In addition, relay 4–TS released, opens the previously-described operating path for relay 4–TBS by way of make contacts 4–TS–6 and relay 4–TBS releases.

During the transmission of the stop element, relay 8–DC releases and relay 7–EF9 releases in sequence as previously described. The release of relay 8–DC opens the previously-described locking path for relay 4–TE and relay 4–TE released, completes the previously-described operating path for relay 4–TP1 which locks and releases relay 4–TP0 as previously described. The circuit is now in the same condition as the condition of the circuit at the conclusion of the printing of the alarm indications when one or more relays 2–A00 through 2–A05 are operated. The scanning and printing of the alarm indications in the second subgroup of register relays, namely, relays 2–A05 through 2–A09, now proceed.

The operation of relay 4–TP1 completes an energizing path for relays 4–TS from battery via the winding of relay 4–TS, break contacts 4–TP3–2, break contacts 4–TP2–2, make contacts 4–TP1–3, break contacts 4–TP0–14, break contacts 4–TE–2 and make contacts 4–LS–2 to ground, operating relay 4–TS. Relay 4–TS operated, releases slow-to-release relay 4–TSS and operates relay 4–WT1 which in turn operates relay 4–T1 of counter 401 as previously described. When slow-to-release relay 4–TSS is released, clutch magnet 809 is energized and relays 4–TA and 4–WT2 are operated in sequence as previously described. In the event that one or more of register relays 2–A05 through 2–A09 are operated whereby one or more relays 3–R1 through 3–R5 are operated, the operation of relay 4–TS operates relay 4–REG as previously described. In the event that none of relays 3–R1 through 3–R5 is operated, the release of relay 4–TSS operates relay 4–TBS as previously described.

Assuming that relay 4–REG is operated, the operation of relay 4–TA extends ground by way of the break contacts of contacts 4–T7–1, as previously described, and then by way of make contacts 4–T1–1, the make contacts of contacts 4–FC–1, the break contacts of contacts 4–HC–1 and make contacts 4–REG–3 to lead 603 which extends to the winding of relay 7–SP. Accordingly, distributor 813 is coded with the character Space, as previously described, whereby printer 812 advances to the 11th character position.

During the transmission of the start character, relay 8–DC releases relays 4–TA and 4–WT1 in sequence and relay 4–WT1 advances counter 401 to operate relay 4–T2 and release relay 4–T1 as previously described. During the transmission of the stop element, relay 8–DC releases relay 7–SP which in turn reoperates relay 4–TA as previously described.

The operation of relay 4–TA releases relay 4–WT2 and extends ground by way of the break contacts of contacts 4–T7–1, make contacts 4–T2–1, the make contacts of contacts 4–FC–2, the break contacts of contacts 4–HC–2 and make contacts 4–REG–4 to lead 603 whereby relay 7–SP is reoperated as previously described. The operation of relay 7–SP again codes distributor 813 with the character Space whereby printer 812 advances to the 12th character position.

During the transmission of the start element, relay 8–DC releases relay 4–TA which in turn operates relay 4–WT1 whereby relay 4–T3 operates and relay 4–T2 releases as previously described. During the transmission of the stop element, relay 8–DC releases relay 7–SP, operating relays 4–TA and 4–WT2 in sequence as previously described. In addition, relay 4–TA operated extends the previously-described ground via the break contacts of contacts 4–T7–1 and then by way of make contacts 4–T3–1, the make contacts of contacts 4–FC–3, the break contacts of contacts 4–HC–3, make contacts 4–REG–5 and make contacts 4–REG–2 to contacts 3–R1–2. As previously described, this ground is extendible to lead 619 or 617 in accordance with the operated condition of relay 3–R1 which in turn is controlled by register relay 2–A05. Accordingly, an alarm condition registered in relay 2–A05 effects the operation of relay 3–R1 to extend ground to the winding of relay 7–EF7 while the absence of an alarm condition extends the ground to the winding of relay 7–EF9. Since relay 7–EF7 operated results in the printing of the letter character X and relay 7–EF9 operated results in the printing of the letter character O, the printer will print the letter character X or O in character position 12 in accordance with the presence or absence of an alarm indication registered by relay 2–A05.

During the transmission of the start element, relay 8–DC releases relay 4–TA which in turn releases relay 4–WT1 whereby relay 4–T4 operates and relay 4–T3 releases. During the transmission of the stop element, relay 8–DC releases relay 7–EF7 or 7–EF9 whereby relay 4–TA operates to release relay 4–WT2 as previously described.

The operation of relay 4–TA extends the previously-described ground by way of the break contacts of contacts 4–T7–1 and then by way of make contacts 4–T4–1 to the make contacts of contacts 4–FC–4 and the break contacts of contacts 4–HC–4 to contacts 3–R2–2. Accordingly, printer 812 prints the letter character X or O in character position 13 in accordance with the condition of relay 3–R2.

During the transmission of the start element, relay 8–DC releases relay 4–TA which in turn operates relay 4–WT1 and relay 4–WT1 operates relay 4–T5 and releases relay 4–T4 as previously described. During the transmission of the stop element, relay 8–DC releases relay 7–EF7 or 7–EF9 whereby relays 4–TA and 4–WT2 operate in sequence as previously described.

Relay 4–TA operated, extends the previously-described ground by way of the break contacts of contacts 4–T7–1 and then by way of make contacts 4–T5–1, the make contacts of contacts 4–FC–5 and the break contacts of contacts 4–HC–5 to contacts 3–R3–2. Accordingly, printer 812 prints the character X or O in the 14th character position in accordance with the condition of relay 3–R3.

During the transmission of the start element, relay 8–DC releases relays 4–TA and 4–WT1 in sequence whereby relay 4–T6 operates and relay 4–T5 releases as previously described. During the transmission of the stop element, relay 8–DC releases relay 7–EF7 or 7–EF9 whereby relay 4–TA operates and relay 4–WT2 releases as previously described.

Relay 4–TA operated, extends the previously-described ground by way of the break contacts of contacts 4–T7–1 and then by way of make contacts 4–T6–1, the make contacts of contacts 4–FC–6 and the break contacts of contacts 4–HC–6 to contacts 3–R4–2. Accordingly, printer 812 prints character X or O in the 15th character position in accordance with the condition of relay 3–R4.

During the transmission of the start element, relay 8–DC releases relay 4–TA and operates relay 4–WT1 in sequence and relay 4–WT1 operates relay 4–T7, releases relay 4–T6 and reoperates relay 4–T1 as previously described. During the transmission of the stop element, relay 8–DC releases relay 7–EF7 or 7–EF9 thereby operating relays 4–TA and 4–WT2 as previously described.

Relay 4–TA operated, extends the previously-described ground by way of the make contacts of contacts 4–T7–1 and then by way of make contacts 4–T1–2, the make contacts of contacts 4–FC–7 and break contacts 4–HC–7 to contacts 3–R5–2. Accordingly, printer 812 prints the letter character X or O in the 16th character position in accordance with the condition of relay 3–R5.

Returning now to relay 4–TA operated, a path is completed from battery by way of the winding of relay 4–TE, the make contacts of contacts 4–T7–2, make contacts 4–T1–3, the break contacts of contacts 4–TBS–7, break contacts 4–PL–7, make contacts 4–TP1–4 and make contacts 4–TA–7, operating relay 4–TE which locks as previously described. Relay 4–TE operated, completes the previously-described operating path for relay 4–TSS and completes a path from battery by way of the winding of relay 4–EP1, make contacts 4–TP1–5, the make contacts of contacts 4–TE–1 and make contacts 4–LS–1 to ground, operating relay 4–EP1 which locks by way of make contacts 4–EP1–4 and make contacts 4–LS–1. Relay 4–EP1 operated, opens the previously-described operating path extending from the windings of relays 3–R1 through 3–R5 to the contacts of relays 2–A05 through 2–A09, respectively, and extends the windings of relays 3–R1 through 3–R5 to the contacts of relays 2–A10 through 2–A14, respectively. For example, the winding of relay 3–R1 extends by way of the make contacts of contacts 4–EP0–3, the make contacts of contacts 4–EP1–2, the break contacts of contacts 4–EP2–4, the make contacts of contacts 3–G1–8 and the break contacts of contacts 2–OC0–6 to make contacts 2–A10–1. Accordingly, the control of relays 3–R1 through 3–R5 is now effected by relays 2–A10 through 2–A14.

Returning now to the transmission of the character for the 16th character position, the transmission of the start element operates relay 8–DC which in turn releases relays 4–TA and 4–WT1 in sequence. In addition, the release of relay 4–TA opens the previously-described energizing path for clutch magnet 809 and opens the previously-described locking path for relay 4–TS. The release of relay 4–TS releases relays 4–REG, 4–T1, 4–T7 and 4–WT2 as previously described.

During the transmission of the stop element, relay 8–DC releases whereby relay 7–EF7 or 7–EF9 releases as previously described. In addition, the release of relay 8–DC opens the previously-described locking path for relay 4–TE. Relay 4–TE released, completes a path from battery by way of the winding of relay 4–TP2, the break contacts of contacts 4–EP2–2, the make contacts of contacts 4–EP1–3, the make contacts of contacts 4–EP0–2, the break contacts of contacts 4–TE–1 and make contacts 4–LS–1 to ground operating relay 4–TP2 which locks by way of the make contacts of contacts 4–TP2–1, the break contacts of contacts 4–TP3–1 and make contacts 4–LS–1. Relay 4–TP2 operated, opens the previously-described locking path for relay 4–TP1 and the relay releases.

This concludes the transmission of the alarm indications in the second subgroup comprising relays 2–A05 through 2–A09. In the event, however, that none of relays 2–A05 through 2–A09 is operated, relay 4–REG remains released and relay 4–TBS operates. Accordingly, with the printing mechanism in the tenth character position and relay 4–T1 operated, the operation of relay 4–TA extends the previously-described ground by way of the break contacts of contacts 4–T7–1, make contacts 4–T1–1, the make contacts of contacts 4–FC–1, the break contacts of contacts 4–HC–1 and make contacts 4–TBS–5 to the winding of relay 7–TAB whereby ground is extended to distributor input leads 803 and 805. As previously described, printer 812 responds to this character by tabulating or advancing the typing mechanism to the next tabulate position which in this case is the 16th character position.

During the transmission of the start element, relay 8–DC releases relays 4–TA and 4–WT1 in sequence whereby relay 4–T2 operates and relay 4–T1 releases as previously described. During the transmission of the stop element, relay 8–DC releases relay 7–TAB, reoperating relay 4–TA which releases relay 4–WT2 as previously described. Relay 4–TA operated, extends the previously-described ground by way of the break contacts of contacts 4–T7–1 and then via make contacts 4–T2–1, the make contacts of contacts 4–FC–2, the break contacts of contacts 4–HC–2, make contacts 4–TBS–6 and lead 619 to the winding of relay 7–EF9. This effects the printing of the letter character O in the 16th character position as previously described.

Relay 4–TA operated also completes a path from battery by way of the winding of relay 4-TE, the break contacts of contacts 4-T7-2, make contacts 4-T2-3, the make contacts of contacts 4-TBS-7, break contacts 4-PL-7, make contacts 4-TP1-4 and make contacts 4-TA-7 to ground, operating relay 4-TE which locks as previously described. Relay 4-TE operated, operates relays 4-TSS and 4-EP1 as previously described. Relay 4-EP1 operated, transfers the operating path of relays 3-R1 through 3-R5 from the contacts of the second subgroup of register relays to the contacts of the third subgroup of register relays as previously described.

Returning now to the transmission of the character printed in the 16th character position, the transmission of the start element operates relay 8-DC which in turn releases relay 4-TA. Relay 4-TA released, opens the energizing path of clutch magnet 809 and releases relay 4-TS as previously described. Relay 4-TS released, releases relays 4-TBS and 4-T2 as previously described. During the transmission of the stop element, relay 8-DC releases relays 7-EF9 and 4-TE as previously described. The release of relay 4-TE operates relay 4-TP2 which in turn releases relay 4-TP1 as previously described.

The circuit is now in the same condition as the condition of the circuit at the conclusion of the scanning and printing of the alarm indications of the second subgroup when one or more of the register relays in the second subgroup are operated. The circuit now proceeds to scan and print the alarm indications in the third subgroup of register relays, namely, relays 2-A10 through 2-A14.

When relay 4-TP2 operates, as previously described, an operating path is completed for relay 4-TS to ground by way of break contacts 4-TP3-2, make contacts 4-TP2-5, break contacts 4-TP1-6, break contacts 4-TP0-14, break contacts 4-TE-2 and make contacts 4-LS-2. Relay 4-TS operated, opens the operating path of slow-to-release relay 4-TSS and operates relay 4-WT1 which in turn operates relay 4-T1 as previously described. When relay 4-TSS releases, relay 4-TA operates and the energizing path of clutch magnet 809 is completed as previously described. Assuming that one or more of relays 2-A10 through 2-A14 are operated, relay 4-REG operates in response to the operation of relay 4-TS as previously described. In the event, however, that none of relays 2-A10 through 2-A14 is operated, relay 4-TBS operates when relay 4-TSS releases as previously described.

Assuming that one or more alarm indications are registered in the third subgroup, the operation of relay 4-TA initiates the scanning of the subgroup in substantially the same manner as the second subgroup is scanned. Accordingly, the character Space is coded on the distributor input leads to advance the printer mechanism past the 17th and 18th character positions and the appropriate letter character X or O is coded on the distributor input leads and printed in character positions 19 through 23. During the transmission of the character in the 23rd character position, with relays 4-T7 and 4-T1 operated as previously described, the operation of relay 4-TA completes a path from battery by way of the winding of relay 4-TE, the make contacts of contacts 4-T7-2, make contacts 4-T1-3, the break contacts of contacts 4-TBS-8, break contacts 4-PL-8, make contacts 4-TP2-3 and make contacts 4-TA-7 to ground, operating relay 4-TE which locks as previously described. Relay 4-TE operated, completes a path from battery by way of the winding of relay 4-EP2, make contacts 4-TP2-4, the make contacts of contacts 4-TE-1 and make contacts 4-LS-1, operating relay 4-EP2 which locks by way of make contacts 4-EP2-3 and 4-LS-1. Relay 4-EP2 operated, opens the previously-described paths extending from the windings of relays 3-R1 through 3-R5 to the contacts of relays 2-A10 through 2-A14 and extends the windings of relays 3-R1 through 3-R5 to the contacts of relays 2-A15 through 2-A19. For example, the winding of relay 3-R1 now extends by way of the make contacts of contacts 4-EP0-3, 4-EP1-2, 4-EP2-4 and 3-G1-9 and the break contacts of contacts 2-OC0-7 to make contacts 2-A15-1. Accordingly, the condition of relays 3-R1 through 3-R5 is controlled by the alarm indications registered in the fourth subgroup of relays, namely, relays 2-A15 through 2-A19.

The subsequent release of relay 4-TE completes a path from battery by way of the winding of relay 4-TP3, make contacts of contacts 4-EP2-2, the make contacts of contacts 4-EP1-3, the make contacts of contacts 4-EP0-2, the break contacts of contacts 4-TE-1 and make contacts 4-LS-1 to ground, operating relay 4-TP3 which locks by way of the make contacts of contacts 4-TP3-1 and make contacts 4-LS-1. Relay 4-TP3 opens the previously-described locking path for relay 4-TP2 by way of the break contacts of contacts 4-TP3-1 and relay 4-TP2 releases. This completes the scanning and printing of the third subgroup of alarm indications.

Assuming, however, that no alarm indications are registered in the third subgroup of register relays, relay 4-TBS is operated as previously described. With relays 4-TBS and 4-T1 operated, the operation of relay 4-TA extends ground to the winding of relay 7-TAB, as previously described, and relay 7-TAB in turn extends ground to distributor input leads 803 and 805 in the same manner as previously described for the second subgroup of register relays. Accordingly, printer 812 tabulates or advances to the 23rd character position where the letter character O is printed.

During the printing of the letter character O in the 23rd character position, the operation of relay 4-TA completes a path from battery by way of the winding of relay 4-TE, the break contacts of contacts 4-T7-2, make contacts 4-T2-3, the make contacts of contacts 4-TBS-8, break contacts 4-PL-8, make contacts 4-TP2-3 and make contacts 4-TA-7, operating relay 4-TE which locks as previously described. Relay 4-TE operated, operates relay 4-EP2 as previously described, whereby the operating paths of relays 3-R1 through 3-R5 are transferred from the third subgroup of register relays to the fourth subgroup of register relays as previously described. The subsequent release of relay 4-TE operates relay 4-TP3 which in turn releases relay 4-TP2 as previously described. The circuit is now in the same condition as the condition of the circuit at the conclusion of the printing of the alarm indications in the third subgroup when one or more indications are registered therein. The circuit now proceeds to scan and print the alarm indications in the fourth subgroup of register relays, namely, relays 2-A15 through 2-A19.

Relay 4-TP3 operated, completes a path from battery by way of the winding of relay 4-TS, make contacts 4-TP3-4, break contacts 4-TP2-6, 4-TP1-6, 4-TP0-14 and 4-TE-2 and make contacts 4-LS-2 to ground, operating relay 4-TS. Relay 4-TS operated, releases relay 4-TSS and operates relays 4-WT1 and 4-T1 in sequence as previously described. When slow-to-release relay 4-TSS releases, relay 4-TA operates and the energizing path of clutch magnet 809 is completed as previously described.

In the event that one or more alarm indications are registered in relays 2-A15 through 2-A19, one or more of relays 3-R1 through 3-R5 are operated whereby the operation of relay 4-TS operates relay 4-REG as previously described. If none of relays 3-R1 through 3-R5 is operated, relay 4-TBS operates when relay 4-TSS releases as previously described.

Assuming that one or more alarm indications are registered in the fourth subgroup of register relays, the operation of relay 4-REG and the subsequent operation of relay 4-TA initiates the scanning of the fourth subgroup of relay contacts in the same manner that the previous subgroups were scanned. Accordingly, during the first two rotations of distributor 813, the character Space is coded thereon whereby printer 812 advances to the 26th character position. During the subsequent rotations of distributor 813, the letter character X or O is coded thereon in accordance with the conditions of relays 2–A15 through 2–A18 whereby the appropriate character is printed in the 26th through 29th character positions.

During the transmission of the letter in the 29th character position, relays 4–T7 and 4–T1 operate as previously described. At the conclusion of the transmission of the character, relay 4–TA operates, extending the previously-described ground by way of the make contacts of contacts 4–T7–1 and then by way of make contacts 4–T1–2, the make contacts of contacts 4–FC–7 and the break contacts of contacts 4–HC–7 to contacts 3–R5–2. Assuming relay 2–A19 is released whereby relay 3–R5 is released, this ground is extended to relay 7–EF9 by way of lead 619 whereby the letter character O is printed in the 30th character position. In the event, however, that relay 2–A19 is operated thereby designating a major alarm, relay 3–R5 operated extends ground by way of the make contacts of contacts 3–R5–2, the make contacts of contacts 4–TP3–3 and lead 613 to the winding of relay 7–EF3, operating relay 7–EF3 which locks to ground on lead 620 by way of make contacts 7–EF3–1. Relay 7–EF3 operated, extends ground to distributor input lead 801 and printer 812 in the lower-case condition is arranged to respond thereto by printing the letter character M thereby designating a major alarm condition in Section 1 cabinet 201.

During the transmission of the letter character in the 30th character position, relay 4–T2 operates and relay 4–T1 releases as previously described. When relay 4–TA subsequently operates, relay 4–WT2 releases. In addition, relay 4–TA operated, extends the previously-described ground by way of the make contacts of contacts 4–T7–1 and then by way of make contacts 4–T2–2, the make contacts of contacts 4–FC–8, the break contacts of contacts 4–HC–8, make contacts 4–TP3–5 and lead 601 to the winding of relay 7–CR whereby relay 7–CR operates and locks as previously described. As previously described, relay 7–CR operated impresses the character Carriage-Return on printer 812 whereby the typing mechanism returns to the first character position and the printed record advances to the next subsequent line.

Returning now to relay 4–TA operated, a path is completed from battery by way of the winding of relay 4–TE, the make contacts of contacts 4–T7–2, make contacts 4–T2–4, the break contacts of contacts 4–TBS–9, break contacts 4–PL–9, make contacts 4–TP3–6 and make contacts 4–TA–7 to ground, operating relay 4–TE which locks as previously described. Relay 4–TE operated, completes the previously-described operating path for relay 4–TSS. In addition, relay 4–TE operated, completes a path from battery by way of the winding of relay 4–LE, make contacts 4–TP3–7, the make contacts of contacts 4–TE–1 and make contacts 4–LS–1 to ground, operating relay 4–LE which locks as previously described. Relay 4–LE operated, completes the previously-described operating path for relay 3–GA and relay 3–GA locks by way of contacts 3–GDK–1 as previously described. Relay 3–GA operated, opens the previously-described locking paths for relays 3–WG2 and 3–GK1 and these relays release. In addition, relay 3–GA operated, opens the previously-described operating path for relay 3–G1. The release of relay 3–G1 opens the previously-described path extending from the windings of relays 3–R1 through 3–R5 to the contacts of the register relays in block 310. Relay 3–G1 released also opens the previously-described operating path for relay 3–GUK and relay 3–GUK released, in turn, opens the previously-described operating path for relay 4–LS whereby relay D–LS releases. In addition, the release of relay 3–G1 completes the previously-described operating path for relay 3–GDK by way of the break contacts of contacts 3–G1–1 whereby relay 3–GDK operates.

Returning now to the transmission of the character Carriage-Return, during the transmission of the start element relay 8–DC operates, releasing relay 4–TA as previously described. The release of relay 4–TA opens the previously-described energizing path for clutch magnet 809 whereby distributor 813 stops at the end of the rotation. In addition, relay 4–TA released, opens the previously-described locking path for relay 4–TS and relay 4–TS releases relays 4–T7 and 4–T2 as previously described. During the transmission of the stop element, relays 8–DC and 7–CR release in turn as previously described. In addition, relay 8–DC opens the previously-described locking path for relay 4–TE and relay 4–TE released together with relay 4–LS released, opens the previously-described locking paths for relays 4–EP0 through 4–EP2, 4–LE and 4–TP3 and these relays release. The release of relay 4–LE together with the operation of relay 3–GDK opens the previously-described operating and locking paths for relay 3–GA, releasing the relay.

The release of relay 3–GA concludes the scanning and printing of the alarm indications in Section 1 cabinet 201 and prepares the circuit to initiate the scanning of the alarm indications in Section 2 cabinet 202, which indications are stored by the contacts of relays 2–A20 through 2–A39 generally indicated by block 311.

Assuming now that none of relays 2–A15 through 2–A19 is operated, relay 4–TBS operates as previously described. With relay 4–T1 operated, the subsequent operation of relay 4–TA extends ground by way of the break contacts 4–T7–1, make contacts 4–T1–1, the make contacts of contacts 4–FC–1, the break contacts of contacts 4–HC–1 and make contacts 4–TBS–5 to the winding of relay 7–TAB. Relay 7–TAB operated, extends ground to distributor input leads 803 and 805 and the printing mechanism of printer 812 responds thereto by tabulating or advancing to the 30th character position. During the next rotation of distributor 813 with relay 4–T2 operated, ground is extended to the winding of relay 7–EF9, as previously described, whereby the letter character O is printed in the 30th character position.

During the transmission of the character in the 30th character position, relay 4–T3 operates as previously described. At the conclusion of the transmission of the character, relay 4–TA operates. The operation of relay 4–TA operates relays 7–CR and 4–TE as previously described. In addition, relay 4–TA operated, operates relay 4–WT2 as previously described. Relay 4–TE operated, operates relays 4–TSS and 4–LE as previously described. Since relay 7–CR is operated, the printing mechanism of printer 812 restores to the first character position and the printed record advances to the next line.

During the transmission of the start element, relay 4–TA releases, opening the energizing path of clutch magnet 809 and releases relay 4–TS as previously described. Relay 4–TS in turn releases relays 4–WT1, 4–WT2 and 4–T3 as previously described. During the transmission of the stop element, relay 8–DC releases, releasing in turn relays 7–CR and 4–TE as previously described. The release of relay 4–TE releases relays 4–EP0 through 4–EP2, 4–LE and 4–TP3 as previously described.

Returning now to the operation of relay 4–LE, the previously-described operating path for relay 3–GA is completed and relay 3–GA operated, releases relays 3–WG2, 3–G1 and 3–GK1 as previously described. Relay 3–G1 released, operates relay 3–GDK and releases relay 3–GUK which in turn releases relay 4–LS as previously described. With relay 4–LE released and relay 3–GDK operated, relay 3–GA releases as previously described. This places the circuit in the same condition as the condition of the circuit at the termination of the scanning of the fourth subgroup of register relays when an alarm indication is registered therein.

Recalling now that relay 2–A00 through relay 2–A19 were simultaneously scanned when relay 3–S2 operates together with the operation of relay 3–GC, it was previously-described that the operating path for relay 3-TMG is opened by the operation of relay 3-GC. Assuming now that no alarm indications were registered by Section 1 cabinet 201, relay 3-GDK does not operate and upon the release of relay 3-TMG the operating path for relay 3-BK is completed as previously described. Relay 3-BK operated, completes a path from battery by way of the winding of relay 3-GA, make contacts 3-BK-3 and make contacts 3-GS-5 to ground, operating relay 3-GA which locks by way of make contacts 3-GA-5 and break contacts 3-TMG-2. Relay 3-GA operated, opens the previously-described locking path for relay 3-WG2 and opens the previously-described operating path for relay 3-GC whereby these relays release. Relay 3-GC released, recompletes the previously-described operating path for relay 3-TMG and opens the previously described operating path for relay 3-BK. The operation of relay 3-TMG and the release of relay 3-BK opens the previously-described operating and locking paths for relay 3-GA whereby relay 3-GA releases.

The release of relay 3-GA sets the circuit in the same condition as the condition of the circuit at the termination of the scanning and printing of the alarm indications registered by Section 1 cabinet 201. It is noted, however, that with no alarm indications registered by cabinet 201 the cabinet designation S1 and the alarm registrations are not printed and the printed record is not advanced to the next successive line.

The scanning of Section 2 cabinet 202 initiates with the release of relay 3-GA as previously described. The release of relay 3-GA completes the previously-described operating path for relay 3-WG1 and relay 3-WG1 operates and locks as previously described. Relay 3-WG1 operated, completes a path from ground by way of make contacts 3-GS-6, the make contacts of contacts 3-WG1-3, the make contacts of contacts 3-S2-1 and the winding of relay 3-S3, operating relay 3-S3 which locks by way of the make contacts of continuity contacts 3-S3-2, the break contacts of continuity contacts 3S4-2 and 3-S5-2 and make contacts 3-GS-6.

Returning now to the release of relay 3-GA, the previously-described operating path for relay 3-GC is re-completed and relay 3-GC opens the operating path of relay 3-TMG. In addition, with relays 3-GC and 3-S3 operated, a path is extended from the winding of relay 3-GK by way of make contacts 3-GC-2, the break contacts of contacts 3-WG2-3, make contacts 3-WG1-4, break contacts 3-S6-1 and make contacts 3-S3-3 to lead 304. Lead 304 in turn extends to the contacts of register relays 2-A20 through 2-A39 by way of break contacts of relay 3-G2, as shown in block 311, in the same manner that lead 302 extends to the contacts of relays 2-A00 through 2-A19 by way of the break contacts of relay 3-G1. Accordingly, relay 3-GK is operated in the event that one or more alarm indications are registered by cabinet 202 and, conversely, relay 3-BK operates after the release of relay 3-TMG in the event that no alarm indication is registered as previously described.

Assuming now that relay 3-GK operates, the previously-described operating path for relay 3-GK1 is completed and relay 3-GK1 operated, completes a path from battery by way of the winding of relay 3-G2, make contacts 3-S3-4, break contacts 3-S6-2, make contacts 3-WG1-5, the break contacts of contacts 3-WG2-4, make contacts 3-GK1-2, break contacts 3-GE-3, break contacts 3-GA-4 and make contacts 3-GS-7, operating relay 3-G2.

Relay 3-G2 operated partially completes a path from the contacts of relays 2-A20 through 2-A39 to the windings of relays 3-R1 through 3-R5 by way of lead 303 and lead 305, for example. Relay 3-G2 operated also releases relays 3-GK and 3-GDK as previously described and relay 3-GDK released, releases relay 3-GC which in turn reoperates relay 3-TMG as previously described. In addition, the operation of relay 3-G2 completes the previously described operating path for relay 3-GUK by way of the make contacts of contacts 3-G2-1 and relay 3-GUK in turn operates relay 4-LS as previously described. With relay 4-LS operated, relays 4-TP0 and 4-TS operate in sequence. Relay 4-TS operated, operates relay 4-TW1 which in turn operates relay 4-T1 as previously described. In addition, the operation of relay 4-TS releases relay 4-TSS which in turn operates relay 4-TA. The circuit now proceeds to scan and print the alarm indications registered by relays 2-A20 through 2-A39 in substantially the same manner as previously described for the scanning and printing of the alarm indications in relays 2-A00 through 2-A19.

The operation of relay 4-TA extends the previously-described ground by way of the break contacts of contacts 4-T7-1 and then by way of make contacts 4-T1-1, the make contacts of contacts 4-FC-1, the make contacts of contacts 4-HC-1 and make contacts 3-G2-2 to the winding of relay 7-EFS. Accordingly, with relay 7-EFS operated, the letter S is printed in the first character position.

During the next rotation of distributor 813, the character figures is coded thereon, as previously described, to set printer 812 in the upper-case condition and during the transmission of the character, relay 4-T3 operates as previously described. The subsequent operation of relay 4-TA then extends the previously-described ground by way of the break contacts of contacts 4-T7-1, make contacts 4-T3-1, the make contacts of contacts 4-FC-3, the make contacts of contacts 4-HC-3, make contacts 3-G2-3 and lead 612 to the winding of relay 7-EF2 whereby the number 2 is printed in the second character position.

The alarm registrations are now scanned and printed in the same manner as previously described with relay 4-TE operating after the transmission of the letter for the 30th character position and prior to the transmission of the character Carriage-Return which advances the printed record to the next line and restores the typing mechanism to the first character position. The operation of relay 4-TE operates relay 4-LE which in turn operates relay 3-GA as previously described. Relay 3-GA operated, recompletes the previously-described operating path for relay 3-WG2 and opens the previously-described operating path for relay 3-G2. The consequent release of relay 3-G2 operates relay 3-GDK, as previously described, followed by the release of relay 3-GA.

In the event that no alarm indications are registered by cabinet 202, relay 3-BK operates as previously described. The operation of relay 3-BK completes the operating path for relay 3-GA which in turn operates relay 3-WG2 and releases relay 3-GC as previously described. The release of relay 3-GC releases relay 3-BK and operates relay 3-TMG as previously described. With relay 3-TMG operated and relay 3-BK released, relay 3-GK releases.

The release of relay 3-GA terminates the scanning and printing of the alarm indications registered by cabinet 202 and initiates the scanning and printing of the alarm indications registered by Section 3 cabinet 203, which alarm indications are registered on relays 2-A40 through 2-A59. Relay 3-GA operated, reoperates relay 3-GC and releases relay 3-WG1 as previously described. Relay 3-GC operated, releases slow-to-release relay 3-TMG. The release of relay 3-WG1 completes a path from ground by way of make contacts 3-GS-6, the break contacts of contacts 3-WG1-3, the break contacts of contacts 3-S1-4, make contacts 3-S3-5 and the winding of relay 3-S4 to battery, operating relay 3-S4 which locks by way of the make contacts of continuity contacts 3-S4-2, the break contacts of continuity contacts 3-S5-2 and make contacts 3-GS-6. Relay 3-S4 operated, opens the previously-described locking path for relay 3-S3 and the relay releases.

With relays 3-GC and 3-S4 operated, the operating path for relay 3-GK is extended by make contacts 3-GC-2, the make contacts of contacts 3-WG2-3, break contacts 3-WG1-6, the break contacts of contacts 3-S6-3 and make contacts 3-S4-3 to lead 306. Lead 306 in turn extends by way of break contacts of relay 3-G3 to the contacts of relays 2-A40 through 2-A59, in block 312, in the same manner as lead 302 extends to the contacts of relays 2-A00 through 2-A19 by way of the break contacts of relay 3-G1. Accordingly, relay 3-GK operates in the event that one or more alarm indications are registered in relays 2-A40 through 2-A59 and, conversely, relay 3-BK operates after the release of relay 3-TMG in the event that no alarm indications are registered.

Assuming now that relay 3-GK operates, the previously-described operating path for relay 3-GK1 is completed and relay 3-GK1 completes at path from battery by way of the winding of relay 3-G3, make contacts 3-S4-4, the break contacts of contacts 3-S6-4, break contacts 3-WG1-7, the make contacts of contacts 3-WG2-4, make contacts 3-GK1-2, break contacts 3-GE-3, break contacts 3-GA-4 and make contacts 3-GS-7 to ground, operating relay 3-G3. Relay 3-G3 operated, partially completes a path extending from the contacts of relays 2-A40 through 2-A59 to the windings of relays 3-R1 through 3-R5 by way of lead 303 and lead 316, for example.

The circuit now proceeds to scan and record the alarm indications registered by cabinet 203. As previously described, relay 4-T1 operates prior to the transmission of the first character and the subsequent operation of relay 4-TA extends ground by way of the break contacts of contacts 4-T7-1, make contacts 4-T1-1, the make contacts of contacts 4-FC-1, the make contacts of contacts 4-HC-1 and make contacts 3-G3-2 to the winding of relay 7-EFS whereby the letter S is printed in the first character position. The character Figures is coded on distributor 813 prior to the next rotation thereby placing printer 812 in the upper-case condition as previously described. During the transmission of the character Figures, relay 4-T3 operates and the subsequent operation of relay 4-TA extends ground by way of the break contacts of contacts 4-T7-1, make contacts 4-T3-1, the make contacts of contacts 4-FC-3, the make contacts of contacts 4-HC-3, make contacts 3-G3-3 and lead 613 to the winding of relay 7-EF3. Accordingly, the number 3 is printed in the second character position. The alarm indications are now scanned and recorded, as previously described, terminating with the transmission of the character Carriage-Return to restore the printing mechanism to the first character position and advance the printed record. In addition, relay 3-GA reoperates, as previously described, opening the operating paths of relay 3-WG2 and relay 3-G3 and these relays release. The release of relay 3-G3 recompletes the operating path of relay 3-GDK via the make contacts of contacts 3-G3-1 and relay 3-GDK in turn releases relay 3-GA.

Assuming now that no alarm indications were registered by cabinet 203, relay 3-BK operates as previously described. The operation of relay 3-BK operates relay 3-GA which in turn releases relays 3-GC and 3-WG2. Following the release of relay 3-GC, relays 3-BK and 3-GA release in turn.

With the release of relay 3-GA, the scanning and printing of the alarm indications in cabinet 203 is completed and the scanning and printing of the alarm indications in Input 1 cabinet 204 is initiated.

The release of relay 3-GA reoperates relay 3-WG1 as previously described. Relay 3-WG1 operated, completes a path from ground by way of make contacts 3-GS-6, the make contacts of contacts 3-WG1-3, the break contacts of contacts 3-S2-1, break contacts 3-S3-1, the make contacts of contacts 3-S4-1 and the winding of relay 3-S5 to battery, operating relay 3-S5 which locks by way of break contacts 3-S1-5, the make contacts of continuity contacts 3-S5-2 and make contacts 3-GS-6. Relay 3-S5 operated, opens the previously described locking path for relay 3-S4 and this relay releases.

The release of relay 3-GA reoperates relay 3-GC as previously described. Relay 3-GC operated, extends the winding of relay 3-GK by way of make contacts 3-GC-2, the break contacts of contacts 3-WG2-3, make contacts 3-WG1-4, break contacts 3-S6-1 and make contacts 3-S5-3 to lead 317 whereby the contacts of relays 2-A60 through 2-A79, generally indicated by block 313, are simultaneously scanned by way of the contacts of relay 3-G4 in the same manner that the contacts of relays 2-A00 through 2-A19 are scanned by way of lead 302 and the contacts of relay 3-G1.

With relay 3-GC operated, relay 3-TMG releases, as previously described, and relay 3-GK operates in the event that one or more alarm indications are registered in relays 2-A60 through 2-A79. Alternately, relay 3-BK operates in the event that no alarm indication is registered in the register relays.

Assuming that one or more alarm indications are registered, the consequent operation of relay 3-GK operates relay 3-GK1 as previously described. Relay 3-GK1 operated, extends a path from ground by way of make contacts 3-GS-7, break contacts 3-GA-4, break contacts 3-GE-3, make contacts 3-GK1-2, the break contacts of contacts 3-WG2-4, make contacts 3-WG1-5, break contacts 3-S6-2, make contacts 3-S5-4 and the winding of relay 3-G4 to battery, operating the relay. With relay 3-G4 operated, the windings of relays 3-R1 through 3-R5 are extendible to the contacts of relays 2-A60 through 2-A79 by way of the contacts of relay 3-G4, lead 307 and lead 303, for example.

Prior to the first rotation of distributor 813, relay 4-T1, operates, as previously described, and the subsequent operation of relay 4-TA extends the previously-described ground by way of the break contacts of contacts 4-T7-1 and then by way of make contacts 4-T1-1, the make contacts of contacts 4-FC-1, the make contacts of contacts 4-HC-1 and make contacts 3-G4-2 and lead 618 to the winding of relay 7-EF8. With relay 7-EF8 operated, distributor input leads 802 and 803 are grounded and printer 812 is arranged to respond thereto by printing the letter character I in the first character position.

During the second rotation of distributor 813, the character Figures is applied to select magnet 807 of printer 812. In addition, relay 4-T3 operates during the transmission of the character. The subsequent operation of relay 4-TA extends the previously-described ground by way of the break contacts of contacts 4-T7-1 and then by way of make contacts 4-T3-1, the make contacts of contacts 4-FC-3, the make contacts of contacts 4-HC-3, make contacts 3-G4-3 and lead 611 to the winding of relay 7-EF1. The operation of relay 7-EF1 applies ground to distributor input leads 801, 802, 803 and 805 and printer 812 responds thereto by printing the number 1 in the second character position.

The circuit now proceeds to scan and record the alarm indications registered by Input cabinet 204 concluding with the printing of the character in the 30th position. During the next rotation of distributor 813, the character Carriage-Return is transmitted and relay 4-LE operates, in turn relay 3-GA. Relay 3-GA operated, reoperates relay 3-WG2 and opens the previously-described operating path for relay 3-G4 whereby relay 3-G4 releases. The release of relay 3-G4 reoperates relay 3-GK which releases relay 3-GA as previously described.

Assuming now that no alarm indication is registered by Input 1 cabinet 204, relay 3-BK operates as previously described. The operation of relay 3-BK operates relay 3-GA which in turn releases relay 3-GC and operates relay 3-WG2 as previously described. Relay 3-GC released, releases relay 3-BK and relay 3-GA subsequently releases as previously described.

The release of relay 3-GA completes the scanning of the alarm indication registered by Input 1 cabinet 204 and the scanning of the alarm indications registered by Input 2 cabinet 205 now proceeds.

Relay 3-GA released, operates relay 3-GC and releases relay 3-WG1 as previously described. Relay 3-WG1 released, completes a path from ground by way of make contacts 3-GS-6, the break contacts of contacts 3-WG1-3, the break contacts of contacts 3-S1-4, make contacts 3-S5-5 and the winding of relay 3-S6 to battery, operating relay 3-S6 which locks by way of make contacts 3-S6-5 and 3-GS-6.

Relays 3-GC and 3-S6 operated, extends the winding of relay 3-GK via make contacts 3-GC-2, the make contacts of contacts 3-WG2-3, break contacts 3-WG1-6, the make contacts of contacts 3-S6-3 and make contacts 3-S5-6 to lead 308. Lead 308 in turn extends by way of the contacts of relays 3-G5 and 2-OC4 to the contacts of register relays 2-A80 through 2-A99 generally indicated in block 314. Accordingly, the alarm indications registered in relays 2-A80 through 2-A99 by Input 2 cabinet 205 are simultaneously scanned by relay 3-GK.

As previously described, relay 3-GK operates in the event that one or more alarm indications are registered by Input 2 cabinet 205 and relay 3-BK operates in the event that no alarm indications are registered.

Assuming that relay 3-GK operates, the previously-described operating path for relay 3-GK1 is completed and relay 3-GK1 operated, extends a path from ground by way of make contacts 3-GS-7, break contacts 3-GA-4, break contacts 3-GE-3, make contacts 3-GK1-2, the make contacts of contacts 3-WG2-4, break contacts 3-WG1-7, the make contacts of contacts 3-S6-4, make contacts 3-S5-7 and the winding of relay 3-G5 to battery, operating relay 3-G5.

Relay 3-G5 operated, extends a path from the windings of relays 3-R1 through 3-R5 to the contacts of register relays 2-A80 through 2-A99 by way of the contacts of relay 3-G5 and lead 309, for example.

Subsequent to the operation of relay 3-G5, relay 4-T1 operates, as previously described, and when relay 4-TA operates, ground is extended by way of the break contacts of contacts 4-T7-1, make contacts 4-T1-1, the make contacts of contacts 4-FC-1, the make contacts of contacts 4-HC-1, make contacts 3-G5-2 and lead 618 to the winding of relay 7-EF8. Relay 7-EF8 operated, effects the printing of the letter character I in the first character position. The next character transmitted by distributor 813 is the character Figures, as previously described, and during the transmission thereof relay 4-T3 operates. The subsequent operation of relay 4-TA extends ground by way of the break contacts of contacts 4-T7-1, make contacts 4-T3-1, the make contacts of contacts 4-FC-3, the make contacts of contacts 4-HC-3, make contacts 3-G5-3 and lead 612 to the winding of relay 7-EF2. The operation of relay 7-EF2 effects the printing of the number 2 in the second character position as previously described. The circuit now proceeds to scan and record the alarm indications registered by Input 2 cabinet 205 in the same manner as previously described.

Following the printing of the character in the 30th character position and during the transmission of the subsequent character Carriage-Return, relay 4-LE operates as previously described. The operation of relay 4-LE completes a path from battery by way of the winding of relay 3-GE, make contacts 3-S5-8, make contacts 3-S6-6, make contacts 4-LE-6, break contacts 2-OC0-1 and make contacts 2-AS-4 to ground, operating relay 3-GE which locks by way of the make contacts of contacts 3-GE-2, the break contacts of contacts 2-OC0-1 and make contacts 2-AS-4. Relay 3-GE operated, opens the previously-described operating path for relay 3-GS and the relay releases. The release of relay 3-GS opens the previously-described operating paths for relays 3-GUK, 3-G5, 4-TSS and 4-FC and these relays release. In addition, the release of relay 3-GS opens the previously-described locking paths for relays 3-WG2, 3-GK1, 3-S5, 3-S6, 4-PF and 3-GA and these relays release. The release of relay 3-GUK opens the previously-described operating path for relay 4-LS and relay 4-LS released, releases relay 8-PMT. The release of relay 8-PMT opens the energizing path for motor 811 whereby the driving power for printer 812 and distributor 813 is terminated. At the conclusion of the transmission of the Carriage-Return character, relay 4-TE releases as previously described, and relay 4-TE released, releases relays 4-TP3, 4-LE and 4-EP0 through 4-EP2, as previously described.

This concludes the scanning and printing of the alarm indications registered by the five cabinets and the circuit is now in the initial condition prior to the printing of the time-of-day registration in the first line.

Assuming now that no alarm indications are registered by Input 2 cabinet 205, relay 3-BK operates as previously described. The operation of relay 3-BK operates relay 3-GA. In addition, relay 3-BK operated, completes a path from battery by way of the winding of relay 3-GE, make contacts 3-S5-8, 3-S6-6 and 3-BK-4, the break contacts of contacts 2-OC0-1 and makes contacts 2-AS-4 to ground, operating relay 3-GE which locks as previously described. Relay 3-GA operated, releases relays 3-WG2 and 3-GC as previously described. Relay 3-GC released, releases relay 3-BK as previously described. Relay 3-GE operated, releases relay 3-GS as previously described. Relay 3-GS released, releases relays 3-GA, 3-GDK, 3-S5, 3-S6, 4-PF, 4-FC, 4-HC and 8-PMT. Relay 8-PMT released, removes power from the printer distributor motor 811 as previously described. The circuit is now in the same initial condition as previously described at the termination of the printing of the alarm indications for Input 2 cabinet 205.

Recalling now that relay 3-GE operates at the termination of the printing of the alarm indications, a path is completed from battery by way of the winding of relay 2-APC, break contacts 2-APC-3, the break contacts of contacts 2-OC0-3 and make contacts 3-GE-4 to ground, operating relay 2-APC which locks by way of make contacts 2-APC-3 and 3-GE-4 and, alternately, by way of make contacts 2-APC-4 and 2-AS-5. Relay 2-APC operated, opens the previously-described operating path for relay 2-AS and relay 2-AS released, opens the previously-described operating and locking paths for relay 3-GE. In addition, relay 2-AS released, releases relays 2-AS1 through 2-AS5 and releases the operated ones of register relays 2-A00 through 2-A99 as previously described. With relays 2-AS and 3-GE released, relay 2-APC releases. This removes the registration of the alarm indications in the 2-A register relays.

It is assumed that during the interval that the alarm indications registered in the 2-A register relays are being printed cabinets 201 through 205 are registering alarm indications in the 2-B register relays as previously described. Accordingly, as previously described, relay 2-BS is operated. The subsequent operation of relay 2-TM4 releases relay 2-W1 and the subsequent release of relay 2-TM4 releases relays 2-Z1 as previously described. The release of relay 2-Z1 releases relays 2-IC0 through 2-IC4 and operates relays 2-OC0 through 2-OC4 as previously described. Relay 2-OC0 operated, completes the previously described operating path for relay 3-GS by way of make contacts 2-BS-4 and the make contacts of contacts 2-OC0-1.

With relays 3-GS and 2-OC0 through 2-OC4 operated, the circuit proceeds to print the first line time-of-day entry and to scan and print the alarm designations registered in the 2-B relays in substantially the same manner as previously described for the scanning and printing of the alarm designations registered in the 2-A register relays. It is noted that with relay 2-OC0 operated, the operating path of relay 3-R1 extends to make contacts 2-B00 by way of the make contacts of contacts 2-OC0-2. Similarly, the windings of relays 3-R1 through 3-R5 extend to other contacts of the 2–B register relays by way of the make contacts of relays 2–OC0 through 2–OC4.

At the conclusion of the scanning and printing of the alarm indications registered in the 2–B relays, relay 3–G3 operates as previously described, completing a path from ground by way of the winding of relay 2–BPC, break contacts 2–APC–5, the make contacts of contacts 2–OC0–8 and make contacts 3–GE–4 to ground, operating relay 2–BPC which locks by way of make contacts 2–BPC–4 and 3–GE–4 and, alternately, by way of make contacts 2–BPC–5 and make contacts 2–BS–5. Relay 2–BPC operated, opens the previously-described operating path for relay 2–BS and relay 2–BS released, releases relays 2–BS1 through 2–BS5 and register relays 2–B00 through 2–B99 as previously described. In addition, the release of relay 2–BS opens the previously-described operating path for relay 3–GE and with relays 3–GE and 2–BS released, relay 2–BPC releases.

With the release of relay 2–BPC, the circuit is restored to its initial condition wherein, in the event that alarm indications are registered in the 2–A register relays as previously described, the circuit will again print the first line time-of-day entry and the alarm indications registered in relays 2–A00 through 2–A99.

*Printing the Hour Entry*

The system is arranged to print the first line time-of-day entry at the conclusion of each hour interval in the event that no alarm indications are registered. As previously described, relay 5–THU momentarily operates at the conclusion of each hour interval. The operation of relay 5–THU completes a path from battery by way of the winding of relay 5–HS, FIG. 5, breaks contacts 4–LE–7 and make contacts 5–THU–6 to ground, operating relay 5–HS which locks by way of break contacts 4–LE–7 and make contacts 5–HS–1. The subsequent release of relay 5–THU completes a path from battery by way of the winding of relay 4–PL, break contacts 2–TM3–2 and 2–TM2–3 or, in shunt thereto, make contacts 2–TM1–2 and then by way of break contacts 5–THU–7, make contacts 5–HS–2, break contacts 4–PF–3 and break contacts 4–LE–1 to ground, operating relay 4–PL which locks as previously described.

Relay 4–PL operated, operates relays 4–TSS and 4–LS as previously described. Relay 4–LS operated, operates relay 4–TP0 which in turn operates relay 4–TS as previously described. Relay 4–TS operated, releases relay 4–TSS and operates relay 4–WT1 which in turn operates relay 4–T1 as previously described. When relay 4–TSS releases, the previously-described energizing path for distributor magnet 809 is completed and relay 4–TA operates as previously described.

The operation of relay 4–TA initiates the printing of the first line time-of-day entry in the same manner as previously described. At the termination of the printing of the first line entry, relay 4–LE operates, as previously described, and relay 4–LE in turn opens the previously-described locking path for relay 5–HS. The release of relay 5–HS restores the circuit to the initial quiescent condition.

Although a specific embodiment of the invention has been shown and described, it will be understood that various modifications may be made without departing from the spirit of this invention and within the scope of the appended claims.

What is claimed is:

1. In a system for scanning the condition of a plurality of sources, an array of storage devices, said storage devices arranged in a plurality of groups, said storage devices in each of said groups being arranged in a plurality of subgroups, a source associated with each of said storage devices for conditioning said associated storage device, first scanning means sequentially associated with each of said groups for concurrently scanning all of said storage devices in said associated group, second scanning means sequentially associated with each of said subgroups of storage devices in said associated group of storage devices for concurrently scanning all of said storage devices in said associated subgroup, third scanning means for successively scanning each of said storage devices in said associated subgroup, means responsive to the scanning of a conditioned storage device by said first scanning means for enabling said second scanning means, and means responsive to the scanning of a conditioned storage device by said second scanning means for enabling said third scanning means.

2. In a system for recording the condition of a plurality of sources, an array of storage devices, said array arranged in a plurality of groups of storage devices, said storage devices in each of said groups being arranged in a plurality of subgroups of storage devices, a source associated with each of said storage devices for conditioning said associated storage device, first scanning means for successively scanning each of said groups of storage devices and concurrently scanning all of said storage devices in said scanned group, second scanning means for successively scanning each of said subgroups of storage devices in said scanned group and concurrently scanning all of said storage devices in said scanned subgroup, third scanning means for successively scanning each of said storage devices in said scanned subgroup, means responsive to the scanning of a conditioned storage device by said first scanning means for enabling said second scanning means, and means responsive to the scanning of a conditioned storage device by said second scanning means for enabling said third scanning means.

3. In a system for scanning an array of storage devices, said array arranged in a plurality of groups of storage devices, said storage devices in each of said groups being arranged in a plurality of subgroups of storage devices, means associated with each of said storage devices for conditioning said associated storage device, first scanning means associated with each of said groups for concurrently scanning all of said storage devices in said group, second scanning means associated with each of said subgroups for concurrently scanning all of said storage devices in said subgroup, third scanning means for successively scanning each of said storage devices in said scanned subgroup, first stepping means for successively enabling each of said first scanning means step-by-step, second stepping means for successively enabling each of said second scanning means step-by-step, means effective in the absence of the scanning of a conditioned storage device by said first scanning means for enabling said first stepping means, means responsive to the scanning of a conditioned storage device by said first scanning means for enabling said second scanning means, means effective in the absence of the scanning of a conditioned storage device by said second scanning means for enabling said second stepping means, and means responsive to the scanning of a conditioned storage device by said second scanning means for enabling said third scanning means.

4. In a system for recording the condition of a plurality of sources, said sources arranged in a plurality of groups of sources, first scanning means for successively scanning each of said groups of sources and concurrently scanning all of said sources in said scanned group, second scanning means for successively scanning each of said sources in said scanned group, means responsive to the scanning of a conditioned source by said first scanning means for enabling said second scanning means, a recording instrument for recording code signals upon a recording medium and advancing along said medium a discrete amount for each recording operation thereof and means for advancing said instrument a plurality of said discrete amounts, and means responsive to said first scanning means and effective in the absence of the scanning of a conditioned source by said first scanning means for enabling said advancing means.

5. In a system for recording the condition of a plurality of sources arranged in a group, said group arranged in a plurality of subgroups of sources, first scanning means for successively scanning each of said subgroups of sources and concurrently scanning all of said sources in said scanned subgroup, second scanning means for successively scanning each of said sources in said scanned subgroup, means responsive to the scanning of a conditioned source by said first scanning means for enabling said second scanning means, a recording instrument for recording code signals applied thereto upon a recording medium and advancing along said medium a discrete amount for each recording operation thereof and means for advancing said instrument a plurality of said discrete amounts, means responsive to said second scanning means for applying code signals to said recording instrument in accordance with the conditioning of each of said sources scanned by said second scanning means, and means responsive to said first scanning means and effective in the absence of the scanning of a conditioned source by said first scanning means for enabling said advancing means.

6. In a system for recording the condition of a plurality of sources arranged in a group, said group of sources arranged in a plurality of subgroups of sources, first scanning means for concurrently scanning all of said sources in said group, second scanning means for successively scanning each of said subgroups of sources in said scanned group and concurrently scanning all of said sources in said scanned subgroup, third scanning means for successively scanning each of said sources in said scanned subgroup, means responsive to the scanning of a conditioned source by said first scanning means for enabling said second scanning means, means responsive to the scanning of a conditioned source by said second scanning means for enabling said third scanning means, a recording instrument for recording code signals applied thereto upon a recording medium, and means responsive to said third scanning means for applying code signals to said recording instrument in accordance with the conditioning of each of said sources scanned by said third scanning means.

7. In a system for recording the condition of a plurality of sources, an array of storage devices, said array arranged in a plurality of groups of storage devices, said storage devices in each of said groups being arranged in a plurality of subgroups of storage devices, a source associated with each of said storage devices for conditioning said associated storage device, first scanning means for successively scanning each of said groups of storage devices and concurrently scanning all of said storage devices in said scanned group, second scanning means for successively scanning each of said subgroups of storage devices in said scanned group and concurrently scanning all of said storage devices in said scanned subgroup, third scanning means for successively scanning each of said storage devices in said scanned subgroup, means responsive to the scanning of a conditioned storage device by said first scanning means for enabling said second scanning means, means responsive to the scanning of a conditioned storage device by said second scanning means for enabling said third scanning means, a recording instrument for recording code signals applied thereto on a recording medium, and means responsive to said third scanning means for applying code signals to said recording instrument in accordance with the conditioning of each of said storage devices scanned by said third scanning means.

8. In a system for recording the condition of a plurality of sources, an array of storage devices, said array arranged in a plurality of groups of storage devices, said storage devices in each of said groups being arranged in a plurality of subgroups of storage devices, a source associated with each of said storage devices for conditioning said associated storage device, first scanning means for successively scanning each of said groups of storage devices and concurrently scanning all of said storage devices in said scanned group, second scanning means for successively scanning each of said subgroups of storage devices in said scanned group and concurrently scanning all of said storage devices in said scanned subgroup, third scanning means for successively scanning each of said storage devices in said scanned subgroup, means responsive to the scanning of a conditioned storage device by said first scanning means for enabling said second scanning means, means responsive to the scanning of a conditioned storage device by said second scanning means for enabling said third scanning means, a recording instrument for recording code signals applied thereto on successive positions of a recording medium and tabulating means for advancing said instrument a plurality of said positions, means responsive to said third scanning means for applying code signals to said recording instrument in accordance with the conditioning of each of said storage devices scanned by said third scanning means, and means responsive to said second scanning means and effective in the absence of the scanning of a conditioned storage device by said second scanning means for enabling said tabulating means.

References Cited in the file of this patent
UNITED STATES PATENTS
2,995,411     Morris et al. ------------ Aug. 8, 1961